US010671822B1

(12) United States Patent
Turner et al.

(10) Patent No.: US 10,671,822 B1
(45) Date of Patent: Jun. 2, 2020

(54) MULTIPURPOSE RFID TRANSPONDER AND A SYSTEM FOR READING IT

(71) Applicant: RadicalID, Inc., Rollingbay, WA (US)

(72) Inventors: Leigh Holbrook Turner, North Adelaide (AU); Allan Hugh Goodman, Bainbridge Island, WA (US)

(73) Assignee: RadicalID, Inc., Bainbridge Island, WA (US)

( * ) Notice: Subject to any disclaimer, the term of this patent is extended or adjusted under 35 U.S.C. 154(b) by 0 days.

(21) Appl. No.: 16/567,853

(22) Filed: Sep. 11, 2019

(51) Int. Cl.
*G08B 13/14* (2006.01)
*G06K 7/10* (2006.01)
*H04W 4/80* (2018.01)
*H04L 27/14* (2006.01)
*H01Q 7/00* (2006.01)

(52) U.S. Cl.
CPC ..... *G06K 7/10386* (2013.01); *G06K 7/10138* (2013.01); *G06K 7/10297* (2013.01); *G06K 7/10475* (2013.01); *H01Q 7/00* (2013.01); *H04L 27/14* (2013.01); *H04W 4/80* (2018.02)

(58) Field of Classification Search
CPC .......... G06K 7/10386; G06K 7/10138; G06K 7/10297; G06K 7/10475; H04W 4/80; H01Q 7/00; H04L 27/14
See application file for complete search history.

(56) References Cited

U.S. PATENT DOCUMENTS

| 5,523,749 | A | 6/1996 | Cole | |
|---|---|---|---|---|
| 5,793,305 | A | 8/1998 | Turner | |
| 10,361,593 | B2 | 7/2019 | Kolman | |
| 2009/0045923 | A1 | 2/2009 | Van Eeden | |
| 2017/0255856 | A1* | 9/2017 | Murdoch | G06K 19/07796 |
| 2019/0012589 | A1* | 1/2019 | Ma | G06K 19/07718 |
| 2020/0004996 | A1* | 1/2020 | Kawaguchi | G06K 19/0708 |

OTHER PUBLICATIONS

BSI Standards Publication, Identification Cards—Contactless integrated circuit cards—proximity cards, Part 2: Radio frequency power and signal interface, BS ISO/IEC 144443-2:2016, Third Edition, Jul. 15, 2016, 56 pages.
EM Microelectronic, "Dual Frequency, NFC Type 2 & EPC GEN2 V2 Transponder IC," Jul. 24, 2017, 4423-DS, 51 pages.
(Continued)

*Primary Examiner* — Phung Nguyen
(74) *Attorney, Agent, or Firm* — Koffsky Schwalb LLC; Gary Serbin

(57) ABSTRACT

A magnetic field induction coupled RFID system for scanning and reading at least one object having an RFID tag or inlay label device attached or embedded therein to impart a unique identity to each of the objects. The RFID tag has two distinct modes of air interface protocol operation, such that the tag is capable of being read at close proximity range by a device utilizing a command-and-control protocol, such as an NFC-protocol compatible smartphone or similarly functioning device, and alternatively by an RFID reader utilizing a different protocol capable of supporting efficient high-speed anti-collision features for enabling fast inventorying at item level of retail store items, warehousing, customs and logistics operations over considerably greater interrogation distances, where both protocols utilize substantially the same carrier frequency.

94 Claims, 5 Drawing Sheets

(56) References Cited

OTHER PUBLICATIONS

Finkenzeller, Klaus, "RFID Handbook, Fundamentals and Applications in Contactless Smart Cards, Radio Frequency Identification and Near-Field Communication" translated by Dorte Muller, Third Edition, 2010, (excerpts) 188 pages.
NFC Forum Type 1 Tag Operation Specification, Technical Specification, Apr. 13, 2011, 47 pages.
NFC Forum Type 2 Tag Operation Specification, Technical Specification, May 31, 2011, 53 pages.
NFC Forum Type Tags White Paper V1.0, Apr. 1, 2009—Public, NXP B.V., 24 pages.

\* cited by examiner

MULTIPURPOSE RFID TRANSPONDER AND A SYSTEM FOR READING IT

FIELD OF THE INVENTION

The present invention relates generally to wireless communication systems, and more particularly to Radio Frequency Identification (RFID) technology information exchange using a passive transponder based inductive magnetic field coupled RFID system.

BACKGROUND OF THE INVENTION

RFID technology employs a radio frequency (RF) wireless communication link and small embedded integrated circuitry-based labels or electronic transponders ("tags") to create a system allowing physical objects to be uniquely identified and their movements tracked. The tags function as item-level unique "RF barcodes" that communicate with a reader device (also referred to as an "interrogator" or "reader") without requiring line-of-sight scanning or singulation of the objects. The action of "reading" a tag refers to an RFID reader-device electronics transmitting interrogation messages to the proximately disposed tag or tags and receiving response signal(s) in return.

The embedded tags are generally "passive," meaning they have no batteries but are instead powered entirely by the RF interrogation field of the reader device. Many of the features of today's passive tags have been described by one of the present inventors in U.S. Pat. Nos. 5,523,749 and 5,793,305, which are hereby incorporated by reference in their entirety.

A typical RFID system includes two primary types of components: a reader device and a tag. The tag is typically a miniature label-like device assembly containing an integrated circuit ("IC") chip and an antenna mounted on a flexible plastic or paper substrate, capable of responding, via a wireless air interface channel, to an RF interrogation signal generated and transmitted by the reader device. The tag is configured to generate a return reply signal in response to the RF interrogation signal emitted by the reader, the response signal being modulated in a manner to convey identification or other data stored within the tag or remotely in the cloud (e.g., on the Internet) back to the reader device. As used herein, the term "cloud" is meant to broadly encompass all remote data storage configurations. There are many different types of RFID systems, used in numerous different and varied applications, implementing different air interface and data communication protocols.

Some applications may require an RFID reader to interrogate (read) multiple tags (attached to different products) in a single interrogation session. This may happen, for example, in inventory applications, where a reader is located some distance away from multiple products with tags on them, and the interrogation signal generated and broadcasted by the reader reaches multiple tags at substantially the same time. In such multi-tag reading environments, because different tags may respond to the same interrogation signal at the same time, their return reply signals may collide (interfere with each other), preventing the reader from successfully reading the tags. To overcome this type of problem in multi-tag reading environments, some RFID systems use what are called anti-collision communication protocols. Such protocols either minimize the chances of collisions occurring or can recover from the detected collisions, allowing the reader to successfully read the entire population of tags.

In applications where a reader is very close to a tag, essentially creating a single-tag reading environment, the danger of collisions or signal interferences is very low. As a result, communication protocols utilized in such application either do not have anti-collision features or have very weak anti-collision features. One example of such a protocol is a Near Field Communication ("NFC") protocol, in which a reader is generally positioned less than a few centimeters away from a tag.

In the NFC protocol, however, tag-to-reader communications take place in response to commands issued and transmitted to a tag by the reader. Such communication protocols are referred to as "command-and-control" protocols.

In contrast, some protocols do not require the reader to send out commands. Instead, once an interrogation signal has powered up a tag and the protocol has been detected by the tag's circuitry, the tag returns a reply signal without waiting for any interrogator commands. Such protocols are referred to as "commandless" protocols.

RFID systems can generally be separated into three frequency-dependent categories—(1) systems operating in a low frequency ("LF") band (from 125 kHz to 134 kHz), (2) systems operating in a high frequency ("HF") band (from 3 MHz to 30 MHz), and (3) systems operating in an ultrahigh frequency ("UHF") band (from 860 MHz-960 MHz)—each category having its own characteristics and presenting different technological challenges for RFID system designers. Presently, however, most of the technical discipline and use cases of RFID technology lay in the HF and UHF categories, each imposing different design constraints. For example, tags operating in the HF frequency band typically require a multi-turn loop style magnetic H-field responsive antenna, while tags operating in the UHF band typically use an electric E-field responsive dipole-style antenna.

Another distinguishing feature between HF and UHF RFID systems is the way energy transfer between reader and the passive tag is conducted. For example, in RFID systems operating in the HF band, energy transfer occurs entirely through inductive coupling by RF transformer action, by means of the magnetic H-field and associated magnetic flux lines passing through the proximate tag antenna coil [loop]. As a result, energy coupling for both transponder powering and data exchange occurs via the highly localized near-field, where radio frequency signals decay very rapidly over a relatively short distance. Because of the inherent near-field characteristic of the H-field technology, the interrogation and tag response signals of HF systems die off very rapidly beyond the intended coverage area. Consequently, surrounding environmental effects and variations have much less of an impact on HF-system performance, resulting in very robust tag reading characteristics.

On the other hand, RFID systems operating in the UHF band work by the energy transfer and data communication mechanism of far-field radio propagation of an electromagnetic wave that is radiated from an RFID reader antenna and propagates great distances in free space, imparting long-range capability to such RFID systems. Real power measured in units of $Watts/m^2$ is conveyed in the propagating wave by an E×H Poynting vector and the notion of adjusting the radiated reader power to establish and define an arbitrary read-zone size. The tag data reply communication is produced by reflection of a small amount of that incident RF power in the form of modulated backscattered radio waves to convey communication protocol control signals and identification information from the tag to the distant reader. Unlike the HF systems, UHF systems suffer from environmental multipath propagation problems.

Increasing the radiated power emanating from the UHF reader antenna increasingly illuminates a larger 3-dimensional volume of space containing a broad constellation of tags placed on a variety of different physical objects. The greater the antenna radiated power, the greater the attainable powering and communication distance between the reader and tags.

In such radiated UHF electromagnetic wave, the propagated energy disperses and dissipates at a relatively slow rate with a gentle $1/R^2$ decay law (where R is a distance from the reader's antenna to the tag). As a result, the more uniformly spread UHF reader energy can power and communicate with passive RFID tags over distances spanning many meters. Because the extent and coverage of the attainable read zones is proportional to the RF power level, higher radiated power directly equates to larger read zone, with a substantial increase in the tag's effective powering and communication distances.

By contrast, in an inherently shorter-range magnetic field ("H-field") inductively coupled HF RFID system, tag powering and tag-to-reader communication is considered to be a coupled RF ("RF transformer") configuration, in which the primary winding of the notional transformer comprises the reader antenna coupler coil and the secondary winding of the notional transformer comprises the tag's coil. Any impedance change in the secondary winding of the "air coupled" RF transformer caused by tag load modulation of the magnetic flux line linkages is transformed into a small information and data carrying back-EMF in the reader antenna coupler coil, in which the small-signal perturbations are duly sensed and decoded by RF receiver circuitry in the reader.

Driving an RF current through the reader's antenna coupler coil creates a highly localized magnetic field, the intensity of which in units of amperes/meter (A/m) is directly proportional to the current. The magnetic flux associated with that local field integrates the field over a local surface area and is the appropriate metric in considering the total amount of magnetic field passing through the proximate tag coil. The resultant energizing voltage induced in the tag coil is proportional to (i) the number of magnetic flux lines passing through the enclosed area and (ii) number of loop turns comprising the tag coil. This is classical transformer action between two proximate coils having mutual inductance and an associated coupling coefficient.

One important characteristic of such magnetic-energy-exchange configurations lies in the spatial extent of the three-dimensional field coverage provided by the reader. In these configurations, the three-dimensional field coverage is primarily determined by the geometry and dimensional size of the reader's antenna coupler coil. Within the physically enclosed coil boundaries, the magnetic field and flux in the lateral direction are reasonably constant in magnitude. Beyond those enclosed coil area boundaries, however, magnitude of the field rapidly decays with distance R from the antenna following a very steep inverse cube $1/R^3$ relationship. As a result, incrementally changing magnetic field strength at the reader's antenna by increasing the antenna coil RF current does not change and extend interrogation distance coverage in any appreciable manner. Instead, the interrogation distance coverage depends primarily on the magnitude of the tag's activation field-strength threshold.

Another distinguishing feature of the HF magnetic fields is their tolerance and immunity to the deleterious effects of liquids and lossy dielectric materials associated with many items to which the tags are attached. These robust environmental tolerance characteristics contrast with UHF RFID systems, which exhibit constrained read performance in this respect.

Accordingly, as explained above, important operational distinctions exist between radiative far-field UHF RFID systems and the inductive near-field magnetic H-field coupled HF RFID systems. Within the HF system category of RFID, however, there exists a further technology subdivision of very-short-range NFC identification systems, earlier identified. This subdivision is predominantly based around the now ubiquitous smartphone as the consumer empowered electronic label reading device that can read tags at up to only a few centimeters. These systems use a well-known NFC communication protocol that operates at a single 13.56 MHz carrier frequency, which is in the HF band. Notably, today's smartphones and other RFID-enabled consumer devices do not embrace UHF readers for UHF tags.

It is known to have a multi-frequency passive tag with two operational modes, one mode using a communication protocol in the HF band, e.g., the very-short-range NFC protocol, and the other mode using a second communication protocol in the UHF band. Because of the fundamental differences in the requirements of the HF and UHF systems, however, including the use of very different carrier frequencies, such prior art tag utilizes dual antennas and an application specific integrated circuit ("ASIC") that is complex, making both the ASIC and overall tag large and expensive. As a result, such a tag is not useful for ultra-low-cost applications and where hundreds of billions, even trillions of items globally need to be uniquely identified.

Despite the different RFID system architectures and protocols that exist today, there is need for a passive low cost tag having a dual personality with two distinct modes of air interface protocol operation, wherein one mode the tag is capable of being read by an interrogator using one communication protocol, and alternatively by another interrogator operating in the same zone (geographical/jurisdictional area or location) by means of a different protocol, such that both protocols operate on substantially the same carrier frequency.

Furthermore, there is need for a passive low cost tag that has a dual personality with two distinct modes of air interface protocol operation, wherein one mode the tag is capable of being read by an interrogator at close proximity range and alternatively by another interrogator operating in the same zone (geographical/jurisdictional area or location) by means of a different multi-tag reading protocol capable of reading a tag at a non-close (long) ranges utilize substantially the same carrier frequency.

Furthermore, there is need for a passive low cost tag that having a dual personality with two distinct modes of air interface protocol operation, wherein one mode the tag is capable of being read by an interrogator at close proximity range by a command-and-control type protocol and alternatively by another interrogator operating in the same zone (geographical/jurisdictional area or location) by means of a different multi-tag reading protocol having robust anti-collision features and capable of reading a tag at a non-close (long) range, such that both protocols utilize substantially the same carrier frequency.

Furthermore, there is need for a passive low cost tag that has a dual personality with two distinct modes of air interface protocol operation, wherein one mode the tag is capable of being read by an interrogator at close proximity range by a command-and-control type protocol and alternatively by another interrogator operating in the same zone (geographical/jurisdictional area or location) by means of a commandless multi-tag reading protocol having robust anti-collision features and capable of reading a tag at a non-close (long) range, such that both protocols utilize substantially the same carrier frequency.

Furthermore, there is need for a passive low cost tag that has a dual personality with two distinct modes of air interface protocol operation, wherein one mode the tag is capable of being read by an interrogator at close proximity range by an NFC-type protocol and alternatively by another interrogator operating in the same zone (geographical/jurisdictional area or location) by means of a commandless multi-tag reading protocol having robust anti-collision features and capable of reading a tag at a non-close (long) range, such that both protocols utilize substantially the same carrier frequency, such as 13.56 MHz.

Furthermore, there is need for a dual-mode, low cost, passive tag using a single multi-turn loop antenna to communicate with different interrogators that utilize different communication protocols operating on substantially the same carrier frequency.

Furthermore, there is need for an RFID system that utilizes the invented dual-mode passive tag, wherein interrogator-to-tag reading range is increased using an improved interrogator circuitry comprising a directional interrogator antenna with an axially focused magnetic field.

The RFID industry is full of inefficient compound margins, fragmented solutions, and cost and value propositions that are out of synch. It is an object of the present invention to fill a long felt need and perceived failure of others to address problems facing particular technical and market areas that have gone unsolved for a long time and to overcome deficiencies of the prior art.

Improved functionality and lower-cost RFID tag technology of the present dual personality invention will support ALL brands and retailers irrespective of size, enabling customer retention—both online and offline—as well as facilitating direct two-way consumer interactions and user experiences, enabling product authentication, willingly received personalized [pull] advertising, manuals, coupons, etc. Additional direct beneficiaries are throughout supply chain, pharmaceutical, logistics, law enforcement and payment industries.

SUMMARY

The present invention provides a single-frequency magnetic field induction coupled RFID system for scanning and reading at least one object having an RFID tag or inlay label device attached or embedded therein to impart a unique identity to each of the objects. The invention further provides an RFID tag having two distinct modes of air interface protocol operation, where the tag is capable of being read at close proximity range by a device utilizing a command-and-control protocol, such as with an NFC-protocol compatible smartphone or similarly functioning device, and alternatively by an RFID reader utilizing a different protocol capable of supporting efficient high-speed (fast) anti-collision features for enabling fast inventorying at item level of retail store items, warehousing, customs and logistics operations over considerably greater interrogation distances, such that both protocols utilize substantially the same carrier frequency.

In one preferred embodiment, the carrier frequency is 13.56 MHz.

In one embodiment, the fast anti-collision protocol is a commandless protocol.

In one embodiment, the present invention merges and integrates together the hitherto segregated parallel disciplines of traditional high-performance longer range HF RFID systems with the closely related and today's predominantly smartphone based very-short-range NFC technologies into a single dual-mode HF tag architecture sharing a single ASIC chip capable of working optimally in both of these application scenarios.

In one embodiment of the present invention, a passive single-carrier-frequency RFID tag possesses two distinct alternative operational modes: Mode_1, for operating in a consumer or individual reading scenario using a mobile phone or similar device less than a few centimeters (referred to as near-touch-reading or single-tag-reading): and Mode_2, for longer range multi-tag reading applications requiring fast anti-collision capability, for enabling a raft of inventory/supply chain (logistics) and retail store based Point-of-Sale and/or Point-of-Interest applications. In one preferred embodiment, both protocol engines are implemented on a single ASIC chip, and share a common memory, preferably a read-only memory, and a simple uniquely coded ID inscribed during chip manufacture.

In one embodiment, the tag is a passive dual-mode tag comprising an ASIC and a multi-turn loop antenna, where each of the two alternative operative modes implements a different communication protocol, with both protocols using substantially the same HF carrier frequency.

In addition, in one embodiment, one of the modes is a default operating mode using an existing ISO/IEC 14443A style protocol for ensuring backward compatible seamless operation with smartphone and other NFC-reader devices, and the other mode is using a low power consumption fast anti-collision protocol reserved for the longer read distance item inventorying or other supply chain or multi-read related data capture needs. The latter mode being invoked by a special protocol mode-switch signal emanating from the higher power in-store (supply chain reader). In this manner, supply chain continuity is extended right up to the consumer level, for enabling direct interaction with products via ubiquitous smartphones and other NFC-reader devices.

In one embodiment, the fast, anti-collision mode of the tag is invoked by the reader issuing the appropriate unique communication mode-switch trigger event when such fast tag capture capability is required, e.g., inventory applications, supply chain applications, Point of Sale ("POS") applications, etc. At other times, the tag may default to its native NFC Data Exchange Format or NDEF compliant NFC response mode, used by such tag readers as smartphones, PDAs, or similar NFC enabled portable consumer devices. As a result, a portable device is never exposed to any unfamiliar or incompatible tag responses. When interrogated by a smartphone, a PDA, or similar NFC enabled portable consumer device, the tag will duly respond with a standardized NFC Forum NDEF compliant message.

In one embodiment, in a minimalist Mode_1, the tag emulates the behavior and data field format of a conventional NFC tag when the tag is excited by the weak RF field from a low-energy handset, such as a smartphone; and, when the tag is alternatively irradiated and strongly excited by an interrogation field from conventional HF readers, in application use cases requiring fast multiple read inventorying of simultaneously present large groups of tags, the tag automatically changes to the high performance fast anti-collision signaling mode. The mode transition trigger may be the powering RF field strength threshold or, alternatively, a uniquely defined break (interruption dip or gap) in the reader's continuous wave ('CW') RF power field, or such other distinctive and easily implemented mode-selection communication means that the tag circuitry can readily sense and appropriately respond to.

In one embodiment, the tag reacts to an explicit and uniquely purposeful mode-switch trigger signal emanating from an inventorying reader to shift out of its default NFC mode into a high-performance fast anti-collision mode temporarily, after which it reverts to its base level NFC functionality. In another, alternative embodiment the tag may remain locked in the high-performance fast anti-collision mode.

In one embodiment, the invention provides for a handheld reader having a directional antenna capable of projecting its tag-irradiating powering and communication field over considerably greater coverage distances to facilitate efficient inventorying function of reading a large aggregated population of tagged items carrying relatively small-dimensioned tags when they are operating in a high-performance fast anti-collision mode.

In one preferred embodiment, the tag's ASIC architecture relies on hard coded factory-programmed Unique ID numbers ("UIDs") that are not field-programmable, making them secure and difficult to counterfeit. In such a use scenario, the UID numbers relate solely to the tag manufacturer's database for verification. Such database could be manufacturer's in-house database or it could be a "cloud" database. With brand owners, facing rigorous competition and financial losses from grey goods manufacturers and surreptitious parallel market channels increasing their anti-counterfeiting requirements, the unique UIDs can be used for product authentication and additionally for secure payments.

Additionally, the internal architecture and implementation of the semiconductor integrated circuit component of the tag follows a minimalist approach, whereby the circuitry area of the tag is small, and the ASIC chip is very low cost (e.g., much less than USD one cent). One objective of the invention is to enable ubiquitous, seamless, simultaneous fusion and amalgamation of NFC technology with high-performance HF RFID technology at unprecedented ultra-low unit cost.

In one disclosed embodiment, the minimalist air-interface architecture and protocol concepts allow for a small ASIC die size, enabling an ultra-low-cost combination HF/NFC multipurpose tag. In one embodiment, the integrated circuit die is designed to be less than 250 μm×250 μm.

In one embodiment of the invention, a passive RFID tag comprises:
a. a planar multi-turn loop antenna for enabling powering up of the passive RFID tag via wireless inductive coupling of a magnetic field from an interrogator; and
b. an integrated circuit comprising
  i. a memory storing a unique tag identifier;
  ii. a modulator operatively coupled to the planar multi-turn loop antenna;
  iii. a demodulator operatively coupled to the planar multi-turn loop antenna;
  iv. a detector operatively coupled to the demodulator and configured to determine a communication protocol of an interrogation signal;
  v. a controller operatively coupled to the detector, the controller configured to operate the passive RFID tag in a first operating mode and in a second operating mode; wherein the first operating mode enables the passive RFID tag, positioned in a location, to communicate via the planar multi-turn loop antenna utilizing a first carrier signal having a first frequency, with a first interrogator using a first communication protocol: wherein the second operating mode enables the passive RFID tag, positioned in the location, to communicate, via the planar multi-turn loop antenna utilizing a second carrier signal having a second frequency, with a second interrogator using a second communication protocol: and wherein the first frequency is substantially identical to the second frequency. As used herein, and throughout the specification, the term "substantially identical" also includes within its scope the first and second frequencies being identical.

In one embodiment of the invention, the first frequency of the passive RFID tag is an HF frequency, for example 13.56 MHz.

In one embodiment of the invention, the first communication protocol of the passive RFID tag is an NFC-type protocol.

In one embodiment of the invention, the first communication protocol of the passive RFID tag is a short-communication-range command-and-control protocol.

In one embodiment of the invention, the second communication protocol of the passive RFID tag is a commandless asynchronous protocol having a communication range that is greater than a communication range of the first communication protocol, and wherein said controller enables transmissions of the unique tag identifier to the second interrogator via a random hold-off-and-retransmit scheme.

In one embodiment of the invention, the random hold-off-and-retransmit scheme comprises repetitively transmitting the unique tag identifier in a pseudo-random manner at an average duty cycle between about 0.2 percent and about 4 percent. In one embodiment of the invention, the random hold-off-and-retransmit scheme comprises repetitively transmitting the unique tag identifier in a pseudo-random manner at a data rate between about 64 Kbits/sec and 256 Kbits/sec.

In one embodiment of the invention, transmissions of the unique tag identifier include data encoded using a pulse position encoding technique.

In one embodiment of the invention, the first operating mode of the passive RFID tag is a default operating mode, and wherein the tag's controller is configured to switch from the default operating mode to the second operating mode upon tag's protocol detector detecting a trigger (trigger event).

In one embodiment of the passive RFID tag, the second carrier signal is a continuous wave carrier signal, and wherein the trigger is a level of the magnetic field excitation that is greater than a predetermined threshold.

In one embodiment of the passive RFID tag, the second carrier signal is a continuous wave carrier signal, and wherein said trigger is one of (a) a short interruption in the second continuous wave carrier signal and (b) a modulation dip in the second continuous wave carrier signal.

In one embodiment of the passive RFID tag, the tag's controller is configured to enable the tag to remain in the second operating mode for a predetermined period of time. In one embodiment of the passive RFID tag, the predetermined period of time is selected from a group of time periods comprising a temporary duration and a permanent duration.

In one embodiment of the passive RFID tag, the unique tag identifier is hard coded into the tag's memory during manufacture of the passive RFID tag. In one embodiment of the passive RFID tag, the memory comprises at least one of a metal mask, a laser fuse, and a one-time-programmable antifuse read only memory, or other methods known to those skilled in the art of hard coding IC chips, in read only memory.

In one embodiment of the invention, a method of using a passive RFID tag, comprises the steps of:
(a) providing the passive RFID tag comprising
  (i) a planar multi-turn loop antenna; and
  (ii) an integrated circuit comprising
    a memory storing a unique tag identifier;
    a modulator operatively coupled to the planar multi-turn loop antenna;
    a demodulator operatively coupled to the planar multi-turn loop antenna;
    a detector operatively coupled to the demodulator; and
    a controller operatively coupled to the detector, the controller configured to operate the passive RFID tag in a first operating mode and in a second operating mode; wherein the first operating mode enables the passive RFID tag, positioned in a location, to communicate, via the planar multi-turn loop antenna utilizing a first carrier signal having a first frequency, with a first interrogator using a first communication protocol;
wherein the second operating mode enables the passive RFID tag, positioned in the location, to communicate, via the planar multi-turn loop antenna utilizing a second carrier signal having a second frequency, with a second interrogator using a second communication protocol; and wherein the first frequency is substantially identical to said second frequency:
(b) transmitting an interrogation signal to the passive RFID tag;
(c) using the planar multi-loop antenna to wirelessly inductively couple a magnetic field of the interrogation signal to power up the passive RFID tag;
(d) using the detector to determine a communication protocol of the interrogation signal, the determined communication protocol being one of the first communication protocol and the second communication protocol;
(e) using the controller to operate the passive RFID tag in an operating mode corresponding to the determined communication protocol, the operating mode being one of the first operating mode and the second operating mode; and
(f) wirelessly communicating, via the multi-turn loop antenna, the tag identifier using the determined communication protocol in response to the interrogation signal.

In one embodiment of the method of the present invention, the determined communication protocol is the first communication protocol with the first carrier frequency in an HF frequency range, for example, about 13.56 MHz.

In one embodiment of the method of the present invention, the first communication protocol is an NFC-type protocol.

In one embodiment of the method of the present invention, the determined communication protocol is the second communication protocol, the second communication protocol being a commandless asynchronous protocol having a communication range that is greater than a communication range of the first communication protocol, and wherein the step of wirelessly communicating the tag identifier in response to the interrogation signal comprises transmitting the unique tag identifier via a random hold-off-and-retransmit scheme.

In one embodiment of the method of the present invention, the random hold-off-and-retransmit scheme comprises repetitive transmissions of the unique tag identifier in a pseudo-random manner at an average duty cycle between about 0.2 percent and about 4 percent. In one embodiment of the method of the present invention, the random hold-off-and-retransmit scheme comprises repetitive transmissions of the unique tag identifier in a pseudo-random manner at a data rate between about 64 Kbits/sec and 256 Kbits/sec.

In one embodiment, the method of the present invention includes a step of encoding the unique tag identifier using a pulse position encoding technique.

In one embodiment of the method of the present invention, first operating mode is a default operating mode, and wherein the controller switches the passive RFID tag from the default operating mode to the second operating mode upon the detector detecting a trigger.

In one embodiment of the method of the present invention, the second carrier signal is a continuous wave carrier signal, and wherein the step of the detector detecting a trigger comprises detecting a level of magnetic field of the interrogation signal that is greater than a predetermined threshold.

In one embodiment of the method of the present invention, the second carrier signal is a continuous wave carrier signal, and wherein the trigger is one of (a) a short interruption in said second continuous wave carrier signal and (b) a modulation dip in said second carrier signal.

In one embodiment of the present invention, the method further comprises maintaining the passive RFID tag in the second operating mode for a predetermined period of time. In one embodiment of the method of the present invention, the predetermined period of time is selected from a group of time periods comprising a temporary duration and a permanent duration.

In one embodiment of the method of the present invention, the unique tag identifier is hard coded into memory during manufacture of the passive RFID tag.

In one embodiment of the method of the present invention, the memory comprises at least one of a metal mask, a laser fuse, and a one-time-programmable antifuse read only memory.

The present invention covers an RFID system comprising:
(a) passive RFID tag comprising
  (i) a planar multi-turn loop antenna for enabling powering up of the passive RFID tag via wireless inductive coupling of a magnetic field: and
  (ii) an integrated circuit comprising
    a memory storing a unique tag identifier,
    a modulator operatively coupled to the planar multi-turn loop antenna;
    a demodulator operatively coupled to the planar multi-turn loop antenna;
    a detector operatively coupled to the demodulator and configured to determine a communication protocol of an interrogation signal;
    a controller operatively coupled to the detector, the controller configured to operate the passive RFID tag in a first operating mode and in a second operating mode:
  wherein the first operating mode enables the passive RFID tag, positioned in a location, to communicate, via the planar multi-turn loop antenna, using a first communication protocol utilizing a first carrier signal having a first frequency;
  wherein the second operating mode enables the passive RFID tag, positioned in the location, to communicate, via the planar multi-turn loop antenna using a second communication protocol utilizing a second carrier signal having a second frequency; and
  wherein the first frequency is substantially identical to the second frequency; and
b. a first interrogator for communicating with the passive RFID tag using a communication protocol that is one of the first communication protocol and the second communication protocol.

In one embodiment of the RFID system of the present invention, the communication protocol of the first interrogator enables communication in a HF frequency range, such as, for example, 13.56 MHz.

In one embodiment of the RFID system of the present invention, the communication protocol of the first interrogator is the first communication protocol, the first communication protocol being an NFC-type protocol.

In one embodiment of the RFID system of the present invention, the communication protocol of the first interrogator is the first communication protocol, the first communication protocol being a short-communication-range command-and-control protocol.

In one embodiment of the RFID system of the present invention, the second communication protocol has a communication range that is greater than a communication range of the first communication protocol, and wherein the communication protocol of the first interrogator is the second communication protocol.

In one embodiment of the RFID system of the present invention, the communication protocol of the first interrogator is a commandless asynchronous protocol, and wherein the controller of the passive RFID tag enables transmissions of the unique tag identifier to the first interrogator via a random hold-off-and-retransmit scheme. In one embodiment of the RFID system of the present invention, the random hold-off-and-retransmit scheme comprises repetitively transmitting the unique tag identifier in a pseudo-random manner at an average duty cycle between about 0.2 percent and about 4 percent. In one embodiment of the RFID system of the present invention, the random hold-off-and-retransmit scheme comprises repetitively transmitting the unique tag identifier in a pseudo-random manner at a data rate between about 64 Kbits/sec and 256 Kbits/sec.

In one embodiment of the RFID system of the present invention, transmissions of the unique tag identifier include data encoded using a pulse position encoding technique.

In one embodiment of the RFID system of the present invention, the first interrogator is configured for use in a fully automated application.

In one embodiment of the RFID system of the present invention, the first operating mode is a default operating mode, and wherein the controller is configured to switch from the default operating mode to the second operating mode upon the detector detecting a trigger from the first interrogator.

In one embodiment of the RFID system of the present invention, the second carrier signal is a continuous wave carrier signal, and wherein the trigger is a level of the magnetic field excitation that is greater than a predetermined threshold.

In one embodiment of the RFID system of the present invention, the second carrier signal is a continuous wave carrier signal, and wherein the trigger is one of (a) a short interruption in the second continuous wave carrier signal and (b) a modulation dip in the second continuous wave carrier signal.

In one embodiment of the RFID system of the present invention, the tag controller is configured to enable the passive RFID tag to remain in the second operating mode for a predetermined period of time. In one embodiment of the RFID system of the present invention, the predetermined period of time is selected from a group of time periods comprising a temporary duration and a permanent duration.

In one embodiment of the RFID system of the present invention, the unique tag identifier is hard coded into the tag's memory during manufacture of the passive RFID tag.

In one embodiment of the RFID system of the present invention, the memory comprises at least one of a metal mask, a laser fuse, and a one-time-programmable antifuse read only memory.

In one embodiment of the RFID system of the present invention, the first interrogator is a portable handheld interrogator comprising a directional antenna, the directional antenna comprising a solenoid coil wound around a ferrite rod core having magnetic permeability Mu in the range of about 40 to 250.

In one embodiment of the RFID system of the present invention, the ferrite rod is a cylinder of a diameter D and a length L, and wherein at least one of the diameter D and the length L is increased to allow the directional antenna to generate magnetic field of at least about 0.15 amperes/meter away from the ferrite rod.

In one embodiment of the RFID system of the present invention, the first interrogator comprises (a) a magnetic core solenoid loop antenna having an inductance value L; and (b) a matching network in series with the magnetic core solenoid loop antenna, the matching network having an effective capacitance value C, wherein the second carrier signal of the second communication protocol of the first interrogator is a continuous wave carrier signal in a HF frequency range, and wherein the matching network and the magnetic core solenoid loop antenna form a circuit having a resonant frequency that is substantially equal to the second frequency.

In one embodiment of the present invention, the RFID system further comprises a second interrogator for communicating with the passive RFID tag using the first communication protocol, the first communication protocol being a command-and-control protocol.

In one embodiment of the RFID system of the present invention, the first frequency of the first carrier signal of the first communication protocol is about 13.56 MHz.

In one embodiment of the RFID system of the present invention, the first communication protocol is an NFC-type protocol.

BRIEF DESCRIPTION OF THE FIGURES

The accompanying figures, where like reference numerals refer to identical or functionally similar elements throughout the separate views, together with the detailed description below, are incorporated in, form part of the specification, and serve to further illustrate embodiments of concepts that include the claimed invention and explain various principles and advantages of those embodiments.

Figure 1:
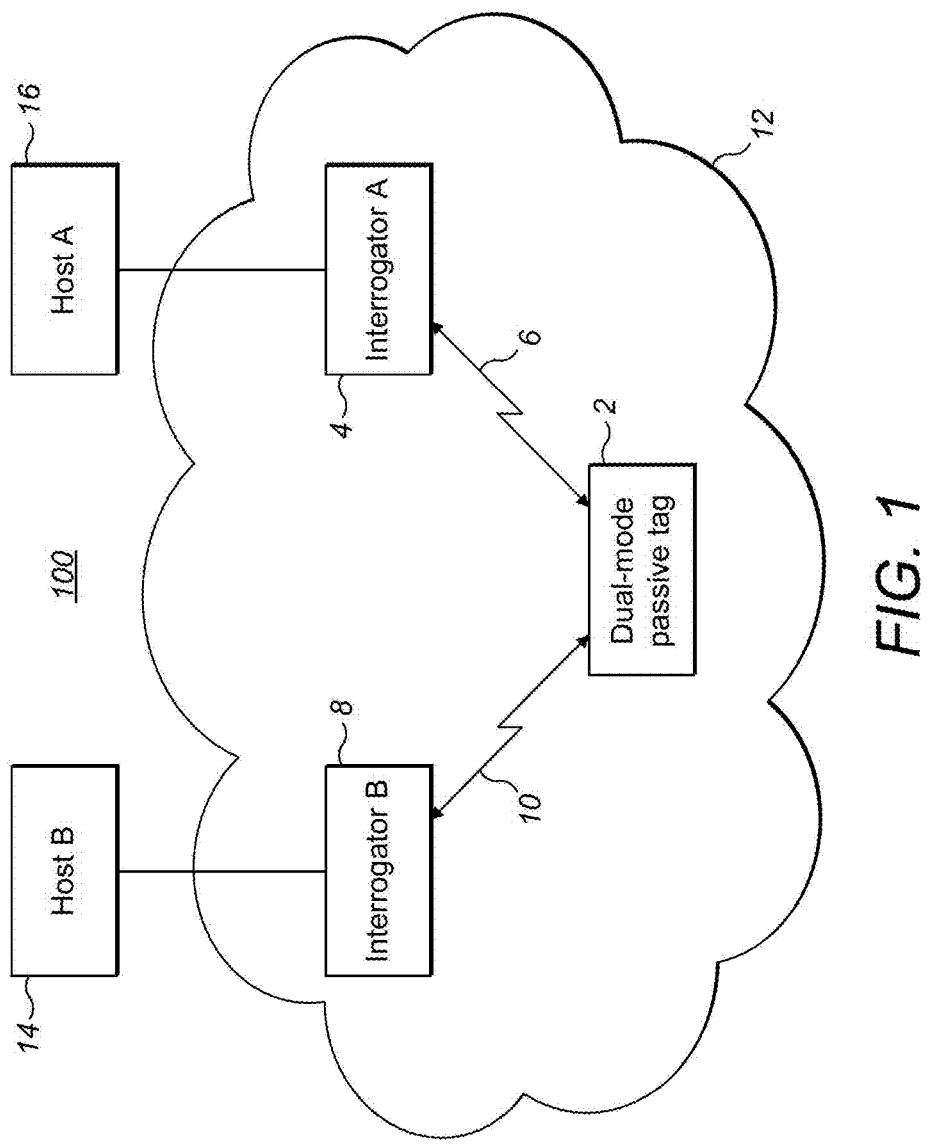
FIG. 1 illustrates an RFID system in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the passive dual-mode RFID tag and system of the present invention.

RFID system consists of a host (such as a backend computer networks, LANS, WANS, servers, databases, Internet cloud, etc.) and various RF components. The RF component configuration comprises an interrogator (reader device) and one or more passive tags.

FIG. 1 illustrates an embodiment of the RFID system of the present invention. The RFID system 100 includes a passive dual-mode tag 2 located in an interrogation zone 12. The figure further depicted two interrogators A and B, identified by reference numerals 4 and 8, respectively, for reading information contained in the tag 2. This way, the tag can communicate with each interrogator at different, alternate times. In the figure, the interrogation zone could be an area, a geographical location, or a jurisdiction boundary within which both interrogators can operate to read the tag of the present invention. Interrogator A communicates with (interrogates) the passive dual-mode tag 2 via a wireless link 6 using one communication protocol, and Interrogator B communicates with (interrogates) the passive dual mode tag 2 via a wireless link 10 using a different communication protocol. Although the two interrogators communicate with the tag 2 at different times, their respective communications protocols use the same or substantially the same carrier frequency. Also, while both communication links are shown as bidirectional, the present invention contemplates using a commandless interrogation protocol, where, once the tag has powered up and detected an interrogation signal, the rest of the information flows from the tag to the interrogator only. Each interrogator may be communicatively coupled to a host system. For example, interrogator A may be coupled to host A, reference 16, and interrogator B may be coupled to host B, reference 14. While the figure illustrates the host systems as located outside the zone 12, one or both host systems may be located within the zone, e.g., when the zone designates a jurisdictional area. Moreover, the two host systems could be combined into a single host system. Although FIG. 1 shows just one dual-mode tag, this was done merely to illustrate the system from the individual tag's perspective. In practical applications, tag 2 may be surrounded or next to other tags and, therefore, operates in a multi-tag environment. In fact, the present invention contemplates having one of the readers interrogating multiple tags using a high-performance, fast communication protocol comprising anti-collision capabilities.

The purpose of the interrogators is to communicate with the tags present in the localized magnetic field and to also power the passive tags through the RF signal. The interrogator communicates with the host system and is responsible for: 1) Protocol handling; 2) Providing power (energy) to passive tags; 3.) Reading tag memory identification (ID) information; 4) Ensuring ID message delivery and validity to host system; 5) Instructing the dual-mode tag to change operating modes; 6) Writing tag information (optionally).

The tags are placed on or embedded within products, such as consumer products, which are desired to be identified and tracked. Each tag has the capability of storing a factory programmed unique ID number and/or programmed data and can communicate this ID information to the interrogator. Each tag includes an integrated circuit ("IC"), such as an ASIC chip, and an antenna. The tag's ASIC chip and antenna design and the interrogator's antenna design dictate some of the limiting parameters of the RFID system, such as attainable read range and read robustness.

Figure 2:
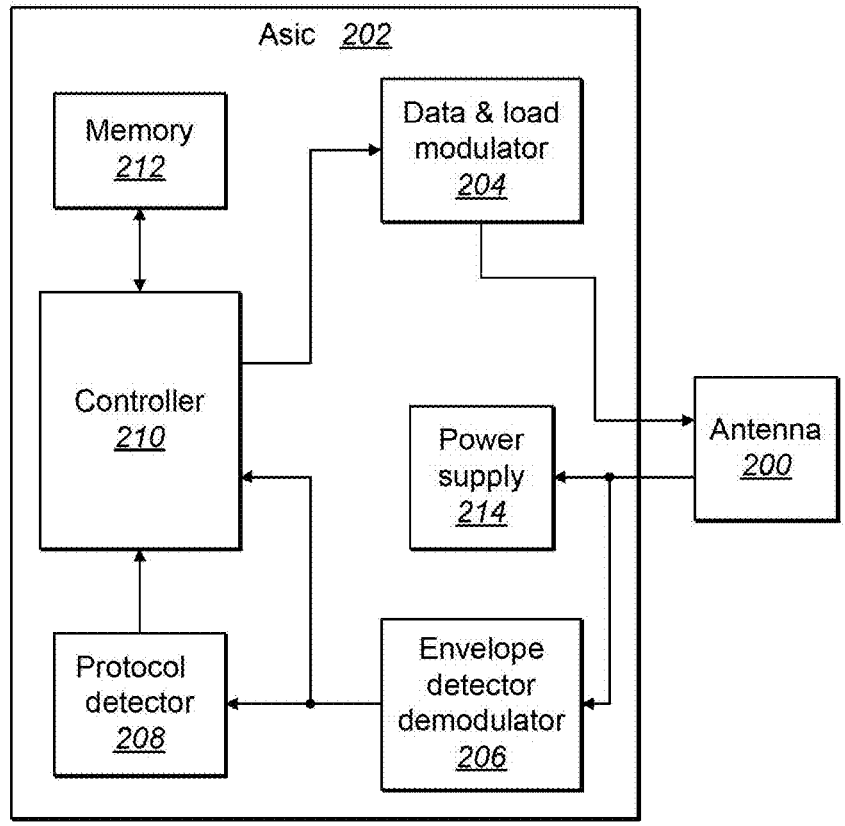
FIG. 2 shows a block diagram of the passive-dual-mode tag in accordance with some embodiments of the present invention.

FIG. 2 shows an embodiment of a block diagram of the passive dual-mode tag of the present invention. The tag includes an antenna 200 coupled to an IC chip 202, which in a preferred embodiment is implemented as an ASIC. In one embodiment, the tag operates in the HF band only, and the antenna 200 is a planar multi-turn loop antenna for operating in the HF band. The antenna enables powering up of the passive RFID tag via wireless inductive coupling of a magnetic field from an interrogator.

The ASIC chip 202 includes several sub-circuits. For example, it includes a power supply 214, comprising rectification circuitry, coupled to the antenna. The power supply 214 extracts energy from the inductively coupled magnetic field emitted by an interrogator (reader), rectifies the incoming signal, and regulates the resulting DC voltage for powering up the rest of the tag's circuitry. Although not shown in the figure, the power supply is coupled to all the other circuits of the ASIC chip 202. The ASIC chip 202, also includes a demodulator and digital decoder circuit 206, operatively coupled to the antenna 200, for processing an interrogation signal that is being received from the reader. Protocol detector 208, for determining a communication protocol of an incoming interrogation signal from the reader, is operatively coupled to the demodulator 206. A controller 210 is operatively coupled to the detector 208, the modulator 204, the demodulator 206, and a memory 212, the latter storing a unique tag identifier ("UID"), an Electronic Product Code (EPC) number, or other data. Alternatively, the UID, Electronic Product Code (EPC) number, or other data may be contained in a hard-coded metal mask or laser fuse, or one-time-programmable ("OTP") antifuse ROM, all of which require a very small die area to realize.

The UID number structure can support the EPC number scheme through the unique ID being translated to a virtual EPC by means of an associative look-up table in the reader, a local or remote server, or the cloud. Similarly, the unique ID can be associated with a website URL or an application identifier in an NFC enabled device, such as a mobile phone, to launch a web browser to deliver detailed product information to a potential purchaser, etc.

The controller 210 is configured to operate the passive tag in two alternate operating modes: Mode_1 and Mode_2. In other words, the controller 210 comprises two engines that are configured to operate the tag according to two different RFID communication protocols. In Mode_1, the tag can communicate, via the planar multi-turn loop antenna utilizing a first carrier frequency, with a first interrogator using a first communication protocol; and in Mode_2 the tag can communicate, via the planar multi-turn loop antenna, with a second interrogator using a second communication protocol. Despite the two communication protocols being different, they use the same or substantially the same carrier frequency. This allows for great simplification of the underlying tag circuitry and utilization of a single antenna in both operating modes.

In one embodiment of the invention, Mode_1 protocol is a command-and-control communication protocol and Mode_2 protocol is a commandless communications protocol.

Further, Mode_1 communications protocol could be a very-short-range communication protocol, and Mode_2 could be a longer-range (up to about one meter free-field) multi-tag communication protocol with anti-collision features. More particularly, Mode_1 protocol could be a simple NFC standards compliant or compatible protocol, which is a very-short-range, synchronous, command-and-control type protocol; and Mode_2 protocol could be a high-performance, multi-tag, commandless, asynchronous protocol with anti-collision features.

In one preferred embodiment, Mode_1 protocol is a basic NFC smartphone very-short-range protocol, where the tag essentially emulates functionality of the existing NFC Forum standard. In such a scenario, Mode_1 operates as a simplified derivative variant of the ISO/IEC 14443-A protocol when irradiated and activated by an NFC enabled mobile smartphone handset or similar PDA reader device. As long as both protocols use the same or substantially the same carrier frequency, any variations of the two protocols are possible, and the invented dual-mode tag can alternatively communicate with different interrogators located in the same zone or location.

Based on the interrogation signal, the detector 208 detects the type of protocol being used by the reader and informs the controller, allowing the tag to operate in the correct protocol. Although FIG. 2 shows the demodulator 206 and detector as separate blocks, the invention is not so limited. To the contrary, the detector 208 could be combined with the demodulator 206, be placed before the demodulator in the signal flow, or be placed in parallel with the demodulator. Other blocks could also be combined, implemented in hardware, firmware, or software. The IC chip of the present invention can be implemented using any one of known semiconductor materials, such as silicon, gallium arsenide, etc. In addition, any known circuit technology can be used to implement the design, such as Nanosheet field-effect transistor technology, ThinFilm Electronics ASA printed transistor technology, the PragmatIC FlexIIC process, Complementary Metal-Oxide Semiconductor ("CMOS") technology, including its Negative-Channel Metal Oxide Semiconductor ("NMOS") and Positive-Channel Metal Oxide Semiconductor ("PMOS") variants. The circuit implementation technology could be single-crystal CMOS, printed electronics ("PE") of any kind, whether silicon or other semiconductor material, whether NMOS, PMOS, CMOS, Nanosheet, or any other technology. In a preferred embodiment, the IC die is implemented in silicon using CMOS technology.

In one preferred embodiment, Mode_2 protocol is an anti-collision protocol that is based on a stochastic process: i.e., transmission of ID codes take place at random intervals. Tags initiate their transmissions immediately upon entering the reader's magnetic energy field and detecting the protocol of the interrogation signal. One indicator that the protocol is the Mode_2 protocol could be the power RF field strength threshold in the reader's continuous wave ("CW") or, alternatively, a uniquely defined break, interruption dip, or gap in the reader's CW power field, or some such distinctive and easily implemented mode identifying communication means that the tag circuitry can readily sense and respond to appropriately. Because in such a protocol, the reader's interrogation signal does not include any commands, the protocol is considered commandless. According to such a protocol, once the tag starts transmitting, its message is repeated at random time intervals as long as the tag remains energized. By selecting an appropriate average duty cycle, collision-arbitration can be optimized for the expected number of tags present in the interrogator's field at any given time.

Most RFID protocols in use today are variations of deterministic and non-deterministic binary search or slotted protocol algorithms. These complex protocols require the reader to initiate and guide tags' anti-collision process by sending appropriate commands to the tags in various two-way bidirectional signaling schemes. Contrastingly, in the minimalist embodiment of the Mode_2 protocol, no signaling command communication from reader to tags is required. Instead, the tag announces itself to the reader by transmitting its ID whenever it is in the presence of the energizing field of an interrogation signal of the Mode_2 protocol.

The reader does not transmit any commands, data or acknowledgements, and all the wireless communication airtime is devoted to the reader collecting tag identities (data). Accordingly, the reader only listens and builds up a register-log record of tag IDs as they are received. The reader continues to detect and discard any reply collisions, which can be ascertained in several ways, including by checking an appended cyclic-redundancy-check field ("CRC") in a tag's data, until the entire tag population is captured error-free. A tag continuously transmits its low-duty-cycle unidirectional message data stream at random until it leaves the energizing RF field.

The Mode_2 collision-arbitration has similarities with a random hold-off-and-repeat (retransmit) tag transmission methodology of the ALOHA protocol, which is widely used in Ethernet systems for arbitration amongst multiple contenders for a single communications channel. In the ALOHA protocol, when a data transmitter attempts a transmission, it also listens. If a data collision is detected, it waits a random time before trying again—"random back-off and wait". Unlike the Ethernet systems, however, the transmitting RFID tags cannot listen to detect collisions. As a result, the minimalist RFID protocol of the present invention differs from the ALOHA protocol in one key aspect, in that instead of listening for collisions, the tag continually retries after a random back-offtime, while the reader (receiver) is the system element that detects and discards the collisions. This scenario yields a statistical probability that tags will sometimes transmit at a time when no other tag is transmitting, thereby enabling the reader to eventually receive a reply signal successfully from each and every tag in the interrogation zone. To trigger tag transmissions at random time intervals, the tag incorporates either a random or a pseudorandom number generator.

A tag programmable parameter may be used to set the maximum interval between transmissions, where the intervals between transmissions are randomly distributed between zero and the chosen maximum. The maximum interval between repeat tag transmissions is determined by the average duty cycle of transmissions. Different maximum intervals may be used in applications having a few fast-moving tags versus applications having many stationary or slowly moving tags. An average duty cycle should be sufficiently low, e.g., from about 0.2% to about 4%, to allow for detection of large numbers of tags, while still fast enough to achieve a reasonable tag throughput rate. Low duty cycles 1:400 are suitable for most inventorying and supply-chain-item-tagging applications, allowing for the simultaneous detection of large tag populations comprising several hundred tags when such tag interval is deployed in combination with tag transmissions having a high bit rate. Although not limited to any particular value, typical tag transmission rate values are preferably chosen in the range of 64 Kbit/s to 256 Kbit/s, with the higher values rapidly accelerating the reading session. Depending on an application, however, the use of lower and higher bit rates, is also contemplated by the present invention. The larger (longer) duty cycle values accommodate smaller numbers of rapidly moving tags. By selecting an appropriate average duty cycle, collision arbitration can be optimized to provide optimum throughput for the number of tags expected to be present in the interrogator RF field at any given time. Thus, based on application, tag throughput can be optimized by proper selection of the interval and baud rate parameters. This results in low bandwidth and small spectrum occupancy requirements, as well as a reduced radio-spectrum-overlap interference.

Figure 5:
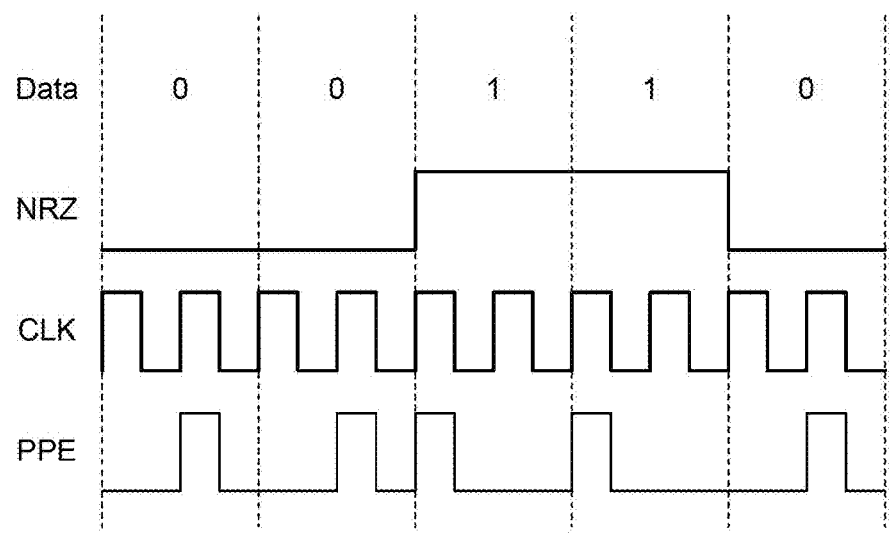
FIG. 5 illustrates the pulse position tag data encoding scheme in accordance with some of the embodiments of the present invention.

In one embodiment of the invention, transmission data encoding may be either Manchester type, known in the art, or preferably more energy efficient Pulse Position Encoding ("PPE"). As illustrated in FIG. 5, in PPE, a data-1 is represented by a HIGH in the first quarter of a symbol period, while a data-0 is represented by a HIGH in the third quarter of a symbol period. The use of the invented protocol greatly simplifies both the tag's ASIC chip design and the interrogator's design, the former greatly reducing the ASIC's size and allowing tags to be manufactured at very low-cost.

Figure 3:
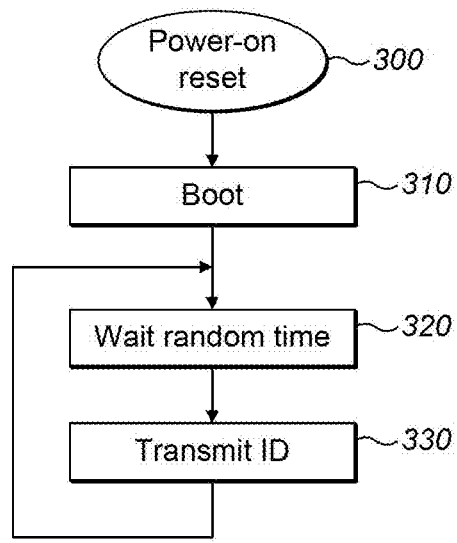
FIG. 3 is a protocol flow diagram from a RFID tag's perspective in accordance with some embodiments of the present invention.
Figure 4:
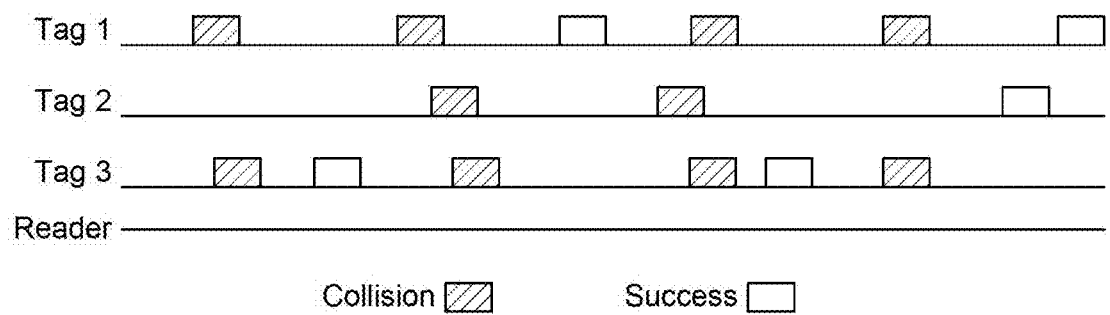
FIG. 4 illustrates an asynchronous protocol operation in a multi-tag environment from the reader's perspective over time in accordance with some embodiments of the present invention.

The above described operation according to the invented Mode_2 protocol is illustrated in FIGS. 3 and 4. FIG. 3 is a protocol flow diagram from an RFID tag's perspective. It is hereby explained in a context of circuitry that may be implemented in the tag. Once the tag enters the reader's magnetic field, it powers up and resets. This is shown by step 300. After the power-on reset (POR) has executed, the tag chip loads the seed read-only-memory (ROM) contents into a random number generator circuit. This is shown by Step 310. In addition, random natural variation in the tag's asynchronous on-chip R-C master clock oscillator center frequency further increases the randomness. The chip then performs Step 320, which consists of clocking a timer counter (preferably 16-bits) with the bit rate clock until it reaches the number in the random number generator. At this point tag's ID code data stream (which is stored in the ID ROM) is transmitted together with any desired preamble at the correct data rate and with proper encoding. This is illustrated by Step 330. After the transmission, the tag returns to step 320 to begin the random-hold-off-and-retransmit cycle. The random number generator is clocked to generate a new pseudo random number, and the 16-bit counter is reset to start a new random delay. The width of the comparison between the 16-bit random number and the 16-bit delay count determines the maximum possible delay between transmissions (repetition rate). Any one of a range of maximum transmission delay settings, say four to eight, can be selected by setting a few ROM bits, along with the desired reply kbit/s Baud data rate selection. The tag continues to perform steps 320 and 330 until the energizing field disappears, either because the reader stopped transmitting the field or because the tag moved out of the field.

Alternatively, and preferably, the least significant 16 bits of the ID, or the CRC, can be used as the seed for a pseudo-random number generator. In order to generate a random delay, a pseudo-random number generator is implemented by means of a Linear Feedback Shift Register (LFSR). The LFSR is initialized at power-up with a factory programmed seed value. The 16-bit counter is clocked until it compares to the value in the LFSR, at which point one ID stream is transmitted, the bit counter is reset and the LFSR is clocked to generate the next pseudo-random number. The simplicity of this implementation utilizes a circuit and digital logic state machine with a low transistor count, resulting in a very small chip size.

FIG. 4 illustrates an asynchronous protocol operation in a multi-tag environment from the reader's perspective over time. The figure shows a reader in an environment where there are three RFID tags that are in the reader energy field and that are transmitting their unique IDs at random intervals. A tag is considered read if it successfully transmits a complete data stream payload without any disturbance as evidenced by a correct CRC. As can be seen from the figure, several collisions can occur before a tag is read successfully. In the figure, the first tag to be read successfully is Tag 3, after its second random transmission. The next successfully read tag is Tag 1, after its third random transmission. Because each tag continues to randomly transmit as long as there is an energy field present, however, FIG. 4 further illustrates that Tag 3 kept transmitting even after its previously successful second transmission and had another successful read of its fifth random transmission. The first successful transmission of Tag 2, however, while occurring on its third random transmission attempt, that attempt did not happen until relatively late in the interrogation cycle.

Because the tags repetitively transmit their respective ID code more than once, the invented free-running protocol has built-in redundancy. Such simple protocol is viable because the tags have unique IDs, with no tags in the population having identically coded IDs, consistent with a premise of the invention that each and every tagged item and object has a unique ID associated with it.

The minimalist complexity and reduced die size of the ASIC required to implement the simple unidirectional commandless free-running protocol of the present invention lends itself perfectly for low cost, high production volume tags for use in a multi-tag reading environment requiring anti-collision functionality.

The above-described asynchronous, commandless, free-running protocol is very different from the synchronous, command-and-control type protocols, such as the NFC protocol, where the reader regulates and manages all tag responses. Another key distinguishing feature of the above-described asynchronous, commandless, free-running protocol is its ability to achieve a longer reading range attributed to the tag's much lower power consumption. This enables a small and inexpensive dual-mode tag IC that could be used in both (i) longer range multi-tag reading applications, such as inventorying applications, and (ii) short-range, or very-short-range, reading applications, such as NFC related application using NFC-enabled mobile smartphones or similar PDA devices.

In one embodiment of the present invention, one of the tag's operational modes is a default mode. For example, if Mode_1 is a default mode, to switch to Mode_2 operation the tag must detect an interrogation signal that is characteristic of the Mode_2 protocol. This could include any type of characteristic. For example, it could be a particular field-strength level of the interrogation signal, a single or double 100% modulated pulse or "gap" in the RF excitation field (i.e., the reader's RF carrier is turned off for a brief interval), or any other means known to one skilled in the art. When using a short "gap" (dip) in the RF excitation field as a protocol indicator, the gap's duration may comprise several bit periods of the tag's internal clock frequency. Moreover, the rise and fall times of the power dip in the carrier should be shaped to minimize any incidental radiation of unwanted spectral energy, as rapid and repetitive switching of the RF powering field generates harmonics and spurious emission sidebands that may violate government regulations.

Once an interrogation signal of a non-default mode protocol has been detected (considered a trigger event), the tag's controller switches operation of the tag to the non-default mode, e.g., Mode_2. Following the switchover to a Mode_2 protocol, upon termination of the RF excitation field from the Mode_2-protocol interrogator, the tag could (a) revert to the default mode, Mode_1, right away; (b) revert to Mode_1 after a predetermined time period, e.g., user programmable: or (c) remain locked in the Mode_2 operation, either permanently or until an occurrence of some defined system event. Any one of the above scenarios is contemplated by the present invention.

Those familiar with the art will appreciate that the priority between modes could be Mode_2 as default, or some other priority scheme or switching method without departing from the dual or multi-mode spirit of the invention.

In an alternative embodiment, there may not be a default mode or there may not be any priority between the different protocol modes. When a tag does not have a default-protocol mode, the tag must check an incoming interrogation signal for each mode's identifying characteristic and switch to a particular protocol-mode only after such operational protocol has been identified. For example, if the incoming interrogation signal has been determined to contain a characteristic of the Mode_1 protocol, the tag's controller will enter Mode_1 protocol operation. If, on the other hand, the incoming interrogation signal has been determined to contain a characteristic of the Mode_2 protocol, the tag's controller will enter Mode_2 protocol operation.

In one embodiment of the invention, the tag's default-protocol mode is an NFC-compatible-protocol mode (Mode_1) and the non-default-protocol mode, Mode_2, is the invented protocol-mode described above, which communicates using a high-performance, multi-tag, asynchronous, collision detecting protocol. If the tag is programmed to switch from the default mode to the non-default mode temporarily, operation may proceed as follows.

The tag reacts to the switchover signal (triggering event) emanating from the inventorying reader: e.g., a gap in the reader's excitation field, to temporarily shift the tag out of its default NFC-compatible-protocol mode into the high-performance, multi-tag, asynchronous, collision-detecting protocol mode. After a predetermined duration, the tag reverts to its default NFC-compatible-protocol functionality.

Alternatively, the triggering event could be the stronger RF power A/m magnetic field strength threshold level of the Mode_2-protocol reader (e.g., inventory-application reader), as compared to the weak RF-field excitation level of the Mode_1 protocol reader, such as the present-day NFC-compatible smartphone reader. For example, the stronger RF power A/m magnetic field strength threshold at the tag could be at least 0.15 A/m.

The tag circuit may incorporate a "persistent state" temporary short-term memory to sustain the protocol mode toggle for a duration of several seconds. Alternatively, the duration of the reader modulation dips may repetitively persist for as long as the tag is required to remain locked in the Mode_2 state. Cessation of the reader modulation would cause the tag to revert to its native NFC-compatible mode.

In addition to increasing an operating range of an RFID system by using an asynchronous, commandless, collision detecting protocol as described above, the range of an RFID system operating in the HF band can be improved further by designing an inventive reader-antenna as described below.

Figure 6:
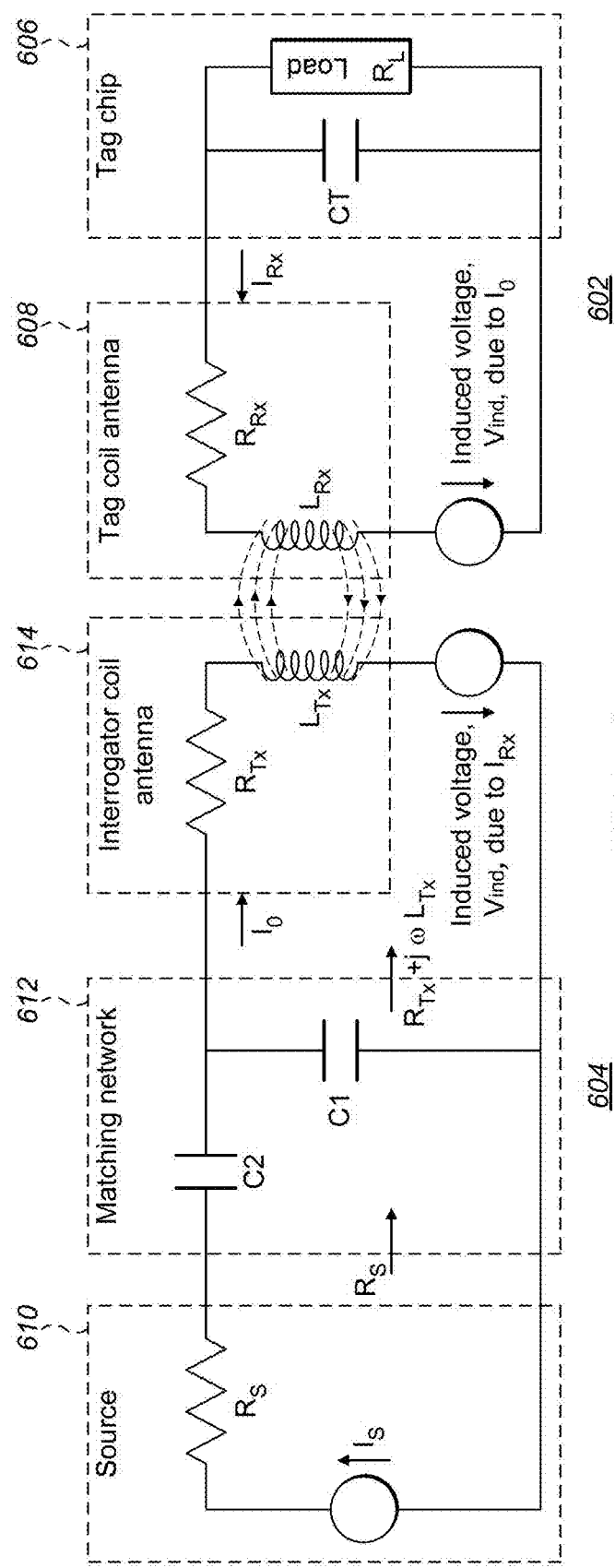
FIG. 6 is an exemplary circuit model of an HF RFID system in accordance with some embodiments of present invention.

As explained in the background section of the specification, in the inductively coupled HF RFID systems, tag powering and tag-to-reader communication are based on an RF transformer circuit model, in which the primary winding of the notional transformer comprises the reader antenna coupler coil and the secondary winding of the notional transformer comprises the tag's multi-turn loop antenna coil. An exemplary circuit model of an HF RFID magnetic flux coupled system according to an embodiment of the present invention is shown in FIG. 6. In the figure, reference 602 represents a circuit model of a passive tag, comprising an IC chip 606 and a tag coil antenna 608. Reference 604 represents a circuit model of a reader, comprising a combination of a signal source (signal power amplifier) 610, a matching network 612, and a reader antenna coupler coil 614. The reader's signal source 610 is modeled as a current source in series with a source resistance $R_S$. The matching network is modeled simplistically as a two-capacitor circuit, in which capacitor $C_1$ is in parallel with the reader coil antenna 614 and capacitor $C_2$ is placed in series between the reader coil antenna 614 and the signal source 610. FIG. 6 further illustrates the magnetic flux lines coupling the reader antenna coil and the tag multi-turn loop antenna coil. Lastly, the model illustrates that the current $I_0$ passing through the reader's antenna coil induces voltage $V_{ind}$ on the tag's side, and the current $I_{RX}$ passing through the tag's antenna induces voltage $V_{ind}$ on the reader's side.

The self-inductance Lax of the tag antenna coil is designed to resonate with the internal tuning capacitance $C_T$ of the IC chip having a capacitance typically about 90 to 110 pF. The Q of the inductor antenna coil resonance must be adequate to provide both efficiency and functionality within the system. Although Q is directly related to read-range performance, it should not be so high as to limit the required system bandwidth or the manufacturability of the product. Both the tag antenna and reader antenna Q factor and associated bandwidth should support the modulation sidebands relating to the data rate of tag transmissions. The tag coil inductance L is inversely related to the IC chip's internal capacitance, such that (e.g., for a constant $f_O$ of 13.56 MHz) increasing C will decrease L. The intent of the relatively large on-chip tuning capacitance of about 100 pF is to provide a smaller form factor tag. The smaller tag multi-turn antenna coil, having smaller magnetic flux collecting area, however, will not achieve the same read range, since its induced voltage $V_{ind}$ ("$V_{TAG}$") is a function of tag size, and the magnitude of the magnetic field strength is dictated by the following governing relationship between the system parameters:

$$V_{TAG}=2\pi f NQB(S \cos \alpha)$$

where:
N=number of loop windings in tag coil LRX
Q=Tag quality factor
B=magnetic field strength S=area of tag coil
α=tag orientation angle The magnetic field strength (B) is generated by the proximate interrogator antenna (AI) and is given by the following equation:

$$B = \frac{\mu_0 N I a^2}{2r^3}$$

where:
I=AI coil current in $L_{TX}$
N=number of windings in AI coil $L_{TX}$
a=radius of IA coil
$\mu_0$=permeability of free space
r=distance from AI From these equations, one skilled in the art can see that in order to double the read range, the current in the reader antenna coil AI generated by the reader must be cubed. Because power is proportional to the square of the current, however, to double the read range requires the reader power to be multiplied by a very large and impractical factor of 64. (P is proportional to $r^6$). Accordingly, available RF power falls off rapidly with the tag-to-reader distance increase (proportional to the inverse sixth power of the tag-to-reader distance, r), while the available voltage falls off as $1/r^3$ (proportional to the inverse cube of the tag-to-reader distance).

Maximum energy coupling occurs for the planar tag when its broad face is aligned parallel to the reader antenna coil AI.

When designing an HF system for optimum read range with the tag communicating via an asynchronous protocol, one must primarily consider the reader's RF power, the tag's power consumption, the tag's quality factor (Q), the tag's coil tuning, the size of the reader's antenna aperture (large), and the size of the tag's antenna aperture area (small).

Secondary considerations include the tag's percentage modulation depth, the reader's signal-to-noise ratio ("SNR"), the reader's antenna tuning, and the angle of tag's orientation with respect to alignment with the reader's H-field.

Because CMOS integrated circuit devices consume more current proportionally with an increase in their internal circuit clocking frequency, tag power consumption in different HF systems can vary widely. As an example, we compare a synchronous HF protocol emulating the NFC Forum NDEF air interface standard operating at 13.56 MHz carrier frequency, required for NFC phone readers, with an asynchronous protocol operating at the same 13.56 MHz carrier frequency.

As a general matter, synchronous air interface protocols derive their clock from an incoming carrier signal. While frequency-dependent consumption is generally not a limiting problem in synchronous tags operating at LF, an HF tag that is deriving its clock from the 13.56 MHz carrier signal has at least one gate that consumes 100 times more current than its LF counterpart. The remainder of the frequency-divider-chain circuitry draws as much or more than the fastest flip-flop gate. Thus, a synchronous HF protocol emulating the NFC Forum NDEF air interface standard is very power-hungry.

In a tag operating at an alternative asynchronous protocol, however, its low-power, on-chip derived master clock R-C oscillator can switch at a considerably lower baseband frequency of 106 kHz (13.56/128) instead of 13.56 MHz. Such slow-speed switching at $1/128^{th}$ of the RF carrier frequency means that at least several gates consume only $1/128^{th}$ of the current of a 13.56 MHz oscillator. Moreover, in an asynchronous protocol, the passive tag uses the reader RF carrier energy only for circuit powering, not for extracting the clock timing through divisional countdown. Accordingly, adopting an asynchronous tag ASIC architecture in an HF RFID system beneficially reduces tag's power consumption, contributing to a longer read range from a small antenna form-factor tag.

RFID-reader designers must also consider the U.S. and foreign counterpart RF regulatory agencies' maximum allowable limits on incidental radiated energy. Regulators generally express limits in power or voltage levels at measurement distances of tens of meters (e.g., 30 meters) from the source, and passive tags in the HF frequency range generally can be read at a distance of only up to 1 to 2 m before incidental reader emissions become problematic. This read-distance limiting scenario exists because the mandated regulatory emission limits relate to the electric E-field component of the electromagnetic ("EM") carrier signal, whereas the inductively coupled tag requires a strong magnetic H-field. To optimize read range in the magnetic near field while seeking to minimize stray emissions in the far field, some reader manufacturers use creative antenna design techniques to maximize the local magnetic field in the vicinity of the reader while substantially cancelling the unwanted electric E-field farther away.

Within these governing limits, the reader's interrogation range can be enhanced by increasing the reader power, which requires increasing the RF current drive into the tuned L-C reader antenna circuit, and by optimizing the impedance match between the power amplifier driver and antenna. Because the aperture area, or diameter/length of the reader antenna coil and the antenna Q quality factor affect read distance much more than the increased reader power level per se, an improvement achievable by this approach has an upper boundary.

Reader antenna size (aperture area) generally dominates an achievable reading distance for a given (small) tag antenna size. Because larger aperture area allows the tag to intercept more lines of magnetic flux from the reader antenna, which intercepted flux lines develop current in the tag coil to power the tag's integrated circuit or ASIC, increasing the tag's antenna diameter or a rectangular enclosed area increases its read range.

At the same time, a larger reader antenna diameter allows the flux lines to extend a further distance in space before wrapping around, providing both distance and more localized flux density for the smaller tag's antenna to intercept. A practical rule of thumb is that the maximum read range in an HF inductively coupled passive tag RFID system is one to two times the reader antenna's diameter.

Figure 7:
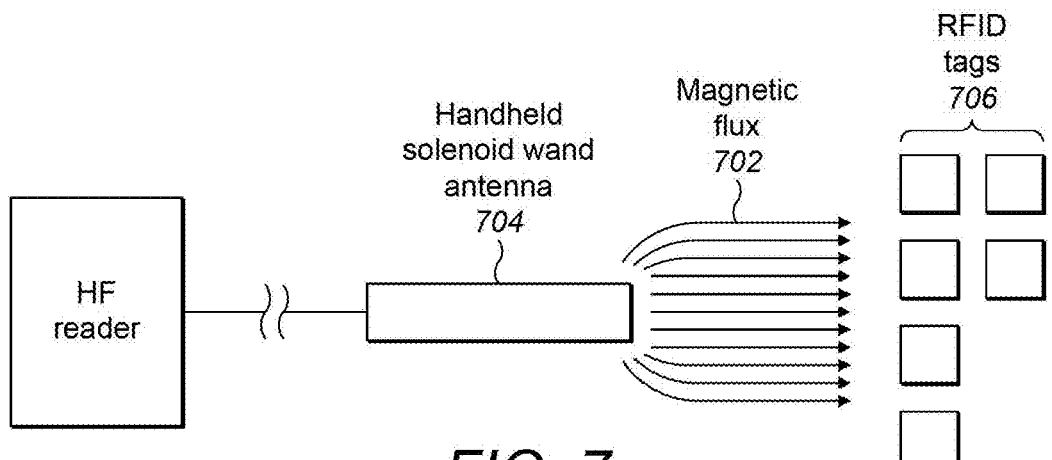
FIG. 7 is a conceptual representation of the magnetic flux lines emanating from a solenoid wand antenna projecting directionally toward multiple RFID tags in accordance with some embodiments of the present invention.

In one embodiment of the invention, to increase read range of a tag with a small-aperture antenna in portable handheld RFID reader applications is to wind the reader antenna coil axially around a high permeability material, such as a ferrite rod, having a $\mu_0$ (Mu) in the range of about 40 to 250, and preferably about 125 or greater. Such design not only makes the reader's magnetic field more directional, but by concentrating the emanating magnetic flux line in one direction, it also increases its projection range along the axis of the high-Mu ferrite rod core. This is conceptually illustrated in FIG. 7, which shows the magnetic flux lines 702 emanating from a solenoid wound antenna 704 projecting directionally toward the multiple RFID tags 706.

Such HF near-field ferrite rod solenoidal based (magnetic core solenoid loop) antennas can project their magnetic flux field a distance roughly comparable to the lineal dimension of the antenna coil and rod core. If the antenna coil area is increased or if the length of solenoid shaped wand antenna stick is increased, then the achievable energy coupling volume extends out to a distance approximately equal to that chosen lineal dimension. Accordingly, for applications using HF multi-tag reading interrogation protocols (e.g., inventorying applications), such as the fast, asynchronous, commandless multi-tag reading protocol described in this specification, the tag-to-reader distance will be limited only by the reader's maximum acceptable reader antenna area or its rod length, before the hand-held stick structure becomes too unwieldy and impractical.

Figure 8:
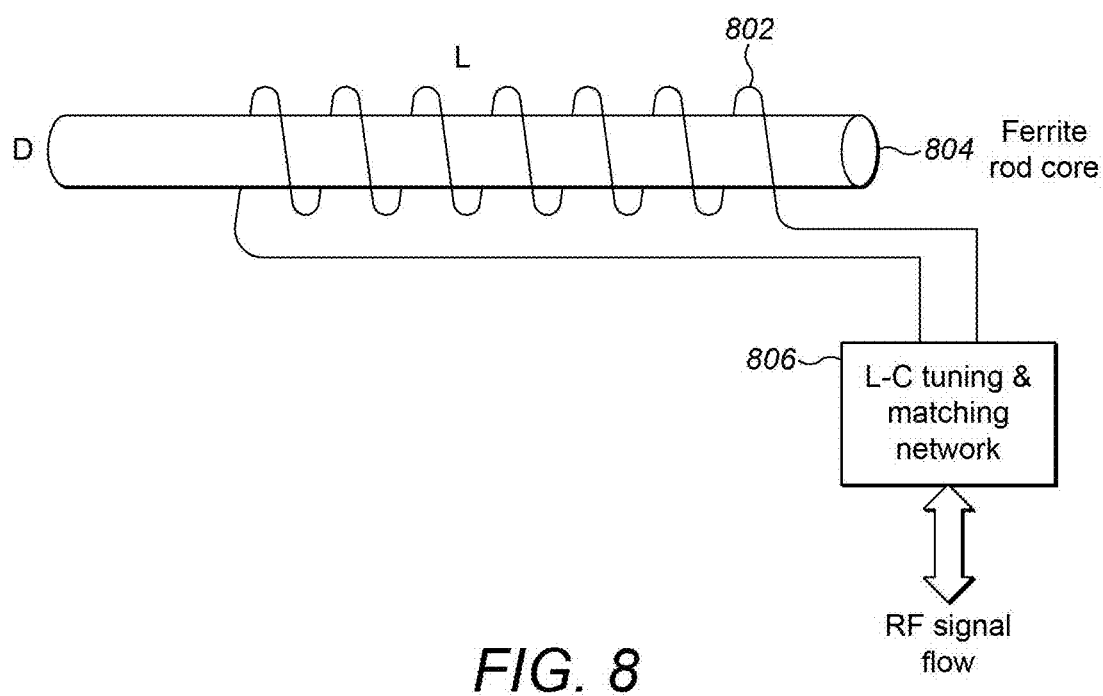
FIG. 8 is a diagrammatic and circuit schematic of a magnetic core solenoid loop antenna in accordance with some embodiments of the present invention.

To generate the maximum H-field projection from an antenna of a reader, as modelled in FIG. 6, e.g., an HF reader emitting a 13.56 MHz continuous wave carrier, the antenna is made series resonant and achieves maximum coil current at the 13.56 MHz resonant frequency. This is so because using a series L-C tuned circuit for the reader antenna coil whose impedance tends toward zero at resonance, maximizes the RF current through a reader antenna coil. An impedance matching network depicted simplistically by circuit elements C1 and C2 of the RFID system circuit model of FIG. 6 is interposed between the reader's RF power amplifier stage 610 (previously referred to as the signal source) and the associated reader antenna coil $L_{TX}$ to ensure maximum power transfer and current in the antenna coil. FIG. 8 depicts in diagrammatic and circuit schematic of an exemplary embodiment of the ferrite rod core (magnetic core) solenoid loop antenna suitable for use in a portable handheld reader of the present invention, such as a reader for use in inventorying, and other multi-tag reading applications. In particular, FIG. 8 illustrates a coil 802 wound around a magnetic rod core, such as a ferrite rod core of length L and diameter D, forming a magnetic core solenoid loop antenna. The coil 802 is series connected to an L-C tuning and matching network 806, to achieve maximum current at the resonant frequency of the carrier signal emitted by the reader. The coil 802 may comprise various spatial configurations including segmentation into two discrete windings contrawound on the ferrite core and fed in antiphase to create a quadupole field. Such a paired magnetic dipole arrangement cancels the dipole moment beneficially suppressing the unwanted far-field radiation component not contributing to tag excitation by the desired localised magnetic flux field component. This increases the small HF tag powering and communication range whilst satisfying regulatory requirements.

Alternatively to the magnetic core solenoid loop antenna used in handheld portable readers described above, the inventorying function reader antenna can be of low profile planar coil form factor, and optionally or additionally be embedded and integrated into the retail store display shelving structure, forming a serially multiplexed antenna array embracing the entire shelf and the tagged items placed thereon.

While the foregoing descriptions disclose specific values, unless expressly stated otherwise, other specific values may be used to achieve similar results. Further, the various features of the foregoing embodiments may be selected and combined to produce numerous variations of improved systems.

In the foregoing specification, exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, the ASIC could be implemented in single-crystal CMOS or printed electronic CMOS, or Printed MOS semiconductor form, or any other form known or to be developed, and therefore the scope of the invention is to be limited only by the claims.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes or contains a list of elements does not include only those elements but may include other elements not expressly listed or inherent to such process, method, article, or apparatus. An element proceeded by "comprises . . . a", "has . . . a", "includes . . . a" or "contains . . . a" does not, without more constraints, preclude the existence of additional identical elements in the process, method, article, or apparatus that comprises, has, includes or contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A passive RFID tag comprising:
   (a) a planar multi-turn loop antenna for enabling powering up of said passive RFID tag via wireless inductive coupling of a magnetic field from an interrogator; and
   (b) an integrated circuit comprising
      i. a memory storing a unique tag identifier;
      ii. a modulator operatively coupled to said planar multi-turn loop antenna;
      iii. a demodulator operatively coupled to said planar multi-turn loop antenna;
      iv. a detector operatively coupled to said demodulator and configured to determine a communication protocol of an interrogation signal; and v. a controller operatively coupled to said detector, said controller configured to operate said passive RFID tag in a first operating mode and in a second operating mode;

wherein said first operating mode enables said passive RFID tag to communicate, via said planar multi-turn loop antenna utilizing a first carrier signal having a first frequency, with a first interrogator using a first communication protocol;

wherein said second operating mode enables said passive RFID tag to communicate, via said planar multi-turn loop antenna utilizing a second carrier signal having a second frequency, with a second interrogator using a second communication protocol;

wherein said first frequency is substantially identical to said second frequency;

wherein said second communication protocol is a command-less asynchronous protocol having a communication range that is greater than a communication range of said first communication protocol; and wherein said controller enables transmissions of said unique tag identifier to said second interrogator via a random hold-off-and-retransmit scheme.

2. The passive RFID tag of claim 1, wherein said first frequency is an HF frequency.

3. The passive RFID tag of claim 2, wherein said first frequency is about 13.56 MHz.

4. The passive RFID tag of claim 3, wherein said first communication protocol is an NFC-type protocol.

5. The passive RFID tag of claim 1, wherein said first communication protocol is a short-communication-range command-and-control protocol.

6. The passive RFID tag claim 1, wherein said random hold-off-and-retransmit scheme comprises repetitively transmitting said unique tag identifier in a pseudo-random manner at an average duty cycle between about 0.2 percent and about 4 percent.

7. The passive RFID tag of claim 1, wherein said random hold-off-and-retransmit scheme comprises repetitively transmitting said unique tag identifier in a pseudo-random manner at a data rate between about 64 Kbits/sec and 256 Kbits/sec.

8. The passive RFID tag claim 1, wherein said transmissions of said unique tag identifier include data encoded using a pulse position encoding technique.

9. The passive RFID tag of claim 1, wherein said first operating mode is a default operating mode, and wherein said controller is configured to switch from said default operating mode to said second operating mode upon said detector detecting a trigger.

10. The passive RFID tag of claim 9, wherein said second carrier signal is a continuous wave carrier signal, and wherein said trigger is a level of said magnetic field excitation that is greater than a predetermined threshold.

11. The passive RFID tag of claim 9, wherein said second carrier signal is a continuous wave carrier signal, and wherein said trigger is one of (a) a short interruption in said second continuous wave carrier signal and (b) a modulation dip in said second continuous wave carrier signal.

12. The passive RFID tag of claim 9, wherein said controller is configured to enable said passive RFID tag to remain in said second operating mode for a predetermined period of time, wherein said predetermined period of time is selected from a group of time periods comprising a temporary duration and a permanent duration.

13. The passive RFID tag of claim 1, wherein said unique tag identifier is hard coded into said memory during manufacture of said passive RFID tag.

14. The passive RFID tag of claim 1, wherein said memory comprises at least one of a metal mask, a laser fuse, and a one-time-programmable antifuse read only memory.

15. A method of using a passive RFID tag, said comprising the steps of:
(a) providing said passive RFID tag comprising
(i) a planar multi-turn loop antenna; and
(ii) an integrated circuit comprising
a memory storing a unique tag identifier;
a modulator operatively coupled to said planar multi-turn loop antenna;
a demodulator operatively coupled to said planar multi-turn loop antenna;
a detector operatively coupled to said demodulator; and
a controller operatively coupled to said detector, said controller configured to operate said passive RFID tag in a first operating mode and in a second operating mode;

wherein said first operating mode enables said passive RFID tag to communicate, via said planar multi-turn loop antenna utilizing a first carrier signal having a first frequency, with a first interrogator using a first communication protocol;

wherein said second operating mode enables said passive RFID tag to communicate, via said planar multi-turn loop antenna utilizing a second carrier signal having a second frequency, with a second interrogator using a second communication protocol;

wherein said first frequency is substantially identical to said second frequency; and wherein said second communication protocol is a commandless asynchronous protocol having a communication range that is greater than a communication range of said first communication protocol;

(b) transmitting an interrogation signal to said passive RFID tag;
(c) using said planar multi-loop antenna to wirelessly inductively couple a magnetic field of said interrogation signal to power up said passive RFID tag;
(d) using said detector to determine a communication protocol of said interrogation signal, said determined communication protocol being one of said first communication protocol and said second communication protocol,
(e) using said controller to operate said passive RFID tag in an operating mode corresponding to said determined communication protocol, said operating mode being one of said first operating mode and said second operating mode; and
(f) wirelessly communicating, via said multi-turn loop antenna, said tag identifier using said determined communication protocol in response to said interrogation signal,
wherein, if said determined communication protocol is said second communication protocol, wirelessly communicating said tag identifier in response to said interrogation signal comprises transmitting said unique tag identifier via a random hold-off-and-retransmit scheme.

16. The method of claim 15, wherein said determined communication protocol is said first communication protocol with said first carrier frequency in an HF frequency range.

17. The method of claim 16, wherein said first carrier frequency is about 13.56 MHz.

18. The method of claim 17, wherein said first communication protocol is an NFC-type protocol.

19. The method of claim 15, wherein said random hold-off-and-retransmit scheme comprises repetitive transmissions of said unique tag identifier in a pseudo-random manner at an average duty cycle between about 0.2 percent and about 4 percent.

20. The method of claim 15, wherein said random hold-off-and-retransmit scheme comprises repetitive transmissions of said unique tag identifier in a pseudo-random manner at a data rate between about 64 kbits/sec and 256 kbits/sec.

21. The method of claim 15, further comprising the step of encoding said unique tag identifier using a pulse position encoding technique.

22. The method of claim 15, wherein said first operating mode is a default operating mode, and wherein said controller switches said passive RFID tag from said default operating mode to said second operating mode upon said detector detecting a trigger.

23. The method of claim 22, wherein said second carrier signal is a continuous wave carrier signal, and wherein the step of said detector detecting a trigger comprises detecting a level of magnetic field of said interrogation signal that is greater than a predetermined threshold.

24. The method of claim 22, wherein said second carrier signal is a continuous wave carrier signal, and wherein said trigger is one of (a) a short interruption in said second continuous wave carrier signal and (b) a modulation dip in said second carrier signal.

25. The method of claim 22, further comprising maintaining said passive RFID tag in said second operating mode for a predetermined period of time, wherein said predetermined period of time is selected from a group of time periods comprising a temporary duration and a permanent duration.

26. The method of claim 15, wherein said unique tag identifier is hard coded into memory during manufacture of said passive RFID tag.

27. The method of claim 15, wherein said memory comprises at least one of a metal mask, a laser fuse, and a one-time-programmable antifuse read only memory.

28. An RFID system comprising:
(a) passive RFID tag comprising
(i) a planar multi-turn loop antenna for enabling powering up of said passive RFID tag via wireless inductive coupling of a magnetic field; and
(ii) an integrated circuit comprising
a memory storing a unique tag identifier;
a modulator operatively coupled to said planar multi-turn loop antenna;
a demodulator operatively coupled to said planar multi-turn loop antenna;
a detector operatively coupled to said demodulator and configured to determine a communication protocol of an interrogation signal;
a controller operatively coupled to said detector, said controller configured to operate said passive RFID tag in a first operating mode and in a second operating mode;
wherein said first operating mode enables said passive RFID tag to communicate, via said planar multi-turn loop antenna, using a first communication protocol utilizing a first carrier signal having a first frequency;
wherein said second operating mode enables said passive RFID tag to communicate, via said planar multi-turn loop antenna, using a second communication protocol utilizing a second carrier signal having a second frequency;
wherein said first frequency is substantially identical to said second frequency; and
wherein said second communication protocol is a commandless asynchronous protocol having a communication range that is greater than a communication range of said first communication protocol;
(b) a first interrogator for communicating with said passive RFID tag using said second communication protocol,
wherein said controller of said passive RFID tag enables transmissions of said unique tag identifier to said first interrogator via a random hold-off-and-retransmit scheme.

29. The RFID system of claim 28, wherein said second communication protocol of said first interrogator enables communication in an HF frequency range.

30. The RFID system of claim 29, wherein said second communication protocol enables communication at about 13.56 MHz.

31. The RFID system of claim 30, wherein said first communication protocol being an NFC-type protocol.

32. The RFID system of claim 28, wherein said first communication protocol being a short-communication-range command-and-control protocol.

33. The RFID system of claim 28, wherein said random hold-off-and-retransmit scheme comprises repetitively transmitting said unique tag identifier in a pseudo-random, manner at an average duty cycle between about 0.2 percent and about 4 percent.

34. The RFID system of claim 28, wherein said random hold-off-and-retransmit scheme comprises repetitively transmitting said unique tag identifier in a pseudo-random manner at a data rate between about 64 kbits/sec and 256 kbits/sec.

35. The RFID system of claim 28, wherein said transmissions of said unique tag identifier include data encoded using a pulse position encoding technique.

36. The RFID system of claim 28, wherein said first interrogator is configured for use in a fully automated application.

37. The system of claim 28, wherein said first operating mode is a default operating mode, and wherein said controller is configured to switch from said default operating mode to said second operating mode upon said detector detecting a trigger from said first interrogator.

38. The RFID system of claim 37, wherein said second carrier signal is a continuous wave carrier signal, and wherein said trigger is a level of said magnetic field excitation that is greater than a predetermined threshold.

39. The RFID system of claim 37, wherein said second carrier signal is a continuous wave carrier signal, and wherein said trigger is one of (a) a short interruption in said second continuous wave carrier signal and (b) a modulation dip in said second continuous wave carrier signal.

40. The RFID system of claim 37, wherein said controller is configured to enable said passive RFID tag to remain in said second operating mode for a predetermined period of time, wherein said predetermined period of time is selected from a group of time periods comprising a temporary duration and a permanent duration.

41. The RFID system of claim 28, wherein said unique tag identifier is hard coded into said memory during manufacture of said passive RFID tag.

42. The RFID system of claim 28, wherein said memory comprises at least one of a metal mask, a laser fuse, and a one-time-programmable antifuse read only memory.

43. The RFID system of claim 28, wherein said first interrogator is a portable handheld interrogator comprising a directional antenna, said directional antenna comprising, a solenoid coil wound around a ferrite rod core having magnetic permeability Mu in the range of about 40 to 250.

44. The RFID system of claim 43, wherein said ferrite rod is a cylinder of a diameter D and a length L, and wherein at least one of said diameter D and said, length L is increased to allow said directional antenna to generate magnetic field of at least about 0.15 amperes/meter away from said ferrite rod.

45. The RFID system of claim 28, wherein said first interrogator comprises
  i. a magnetic core solenoid loop antenna having an inductance value L; and
  ii. a matching network in series with said magnetic core solenoid loop antenna, said matching network having an effective capacitance value C,
    wherein said second carrier signal of said second communication protocol of said first interrogator is a continuous wave carrier signal in an HF frequency range, and wherein said matching network and said magnetic core solenoid loop antenna form a circuit having a resonant frequency that is substantially equal to said second frequency.

46. The RFID system of claim 28, further comprising a second interrogator for communicating with said passive RFID tag using said first communication protocol, said first communication protocol being a command-and-control protocol.

47. The RFID system of claim 46, wherein said first frequency of said first carrier signal of said first communication protocol is about 13.56 MHz, and wherein said first communication protocol is an NFC-type protocol.

48. A passive RFID tag comprising:
  (a) an antenna for enabling powering up of said passive RFID tag via wireless inductive coupling of a magnetic field from an interrogator; and
  (b) an integrated circuit comprising a memory storing a unique tag identifier;
    ii. a modulator operatively coupled to said antenna;
    iii. a demodulator operatively coupled to said antenna;
    iv. a detector operatively coupled to said demodulator and configured to determine a communication protocol of an interrogation signal; and
    v. a controller operatively coupled to said detector, said controller configured to operate said passive RFID tag in a first operating mode and in a second operating mode;
wherein said first operating mode enables said passive RFID tag to communicate, via said antenna utilizing a first carrier signal having a first frequency, with a first interrogator using a first communication protocol;
wherein said second operating mode enables said passive RFID tag to communicate, via said antenna utilizing a second carrier signal having a second frequency, with a second interrogator using a second communication protocol;
wherein said first operating mode is a default operating mode;
wherein said controller is configured to switch from said default operating mode to said second operating mode upon said detector detecting a trigger;
wherein said controller is configured to enable said passive RFID tag to remain, in said second operating mode for a predetermined period of time, wherein said predetermined period of time of time is selected from a group of time periods comprising a temporary duration and a permanent duration;
and
wherein said first frequency is substantially identical to said second frequency.

49. The passive RFID tag of claim 48, wherein said first frequency is an HF frequency.

50. The passive RFID tag of claim 49, wherein said first frequency is about 13.56 MHz.

51. The passive RFID tag of claim 50, wherein said first communication protocol is an NFC-type protocol.

52. The passive RFID tag of claim 48, wherein said first communication protocol is a short-communication-range command-and-control protocol.

53. The passive RFID tag of claim 48, wherein said second communication protocol is a commandless asynchronous protocol having a communication range that is greater than a communication range of said first communication protocol, and wherein said controller enables transmissions of said unique tag identifier to said second interrogator via a random hold-off-and-retransmit scheme.

54. The passive RFID tag of claim 53, wherein said random hold-off-and-retransmit scheme comprises repetitively transmitting said unique tag identifier in a pseudo-random manner at an average duty cycle between about 0.2 percent and about 4 percent.

55. The passive RFID tag of claim 53, wherein said random hold-off-and-retransmit scheme comprises repetitively transmitting said unique tag identifier in a pseudo-random manner at a data rate between about 64 Kbits/sec and 256 Kbits/sec.

56. The passive RFID tag of claim 53, wherein said transmissions of said unique tag identifier include data encoded using a pulse position encoding technique.

57. The passive RFID tag of claim 48, wherein said second carrier signal is a continuous wave carrier signal, and wherein said trigger is a level of said magnetic field excitation that is greater than a predetermined threshold.

58. The passive RFID tag of claim 48, wherein said second carrier signal is a continuous wave carrier signal, and wherein said trigger is one of (a) a short interruption in said second continuous wave carrier signal and (b) a modulation dip in said second continuous wave carrier signal.

59. The passive RFID tag of claim 48, wherein said unique tag identifier is hard, coded into said memory during manufacture of said passive RFID tag.

60. The passive RFID tag of claim 48, wherein said memory comprises at least one of a metal mask, a laser fuse, and a one-time-programmable antifuse read only memory.

61. A method of using a passive RFID tag, said comprising the steps of:
  (a) providing said passive RFID tag comprising
    (i) an antenna;
    (ii) an integrated circuit comprising
      a memory storing a unique tag identifier;
      a modulator operatively coupled to said antenna;
      a demodulator operatively coupled to said antenna;
      a detector operatively coupled to said demodulator; and
      a controller operatively coupled to said detector, said controller configured to operate said passive RFID tag in a first operating mode and in a second operating mode;
wherein said first operating mode enables said passive RFID tag to communicate, via, said antenna, utilizing a first carrier signal having a first frequency, with a first interrogator using a first communication protocol;

wherein said second operating mode enables said passive RFID tag to communicate, via said antenna, utilizing a second carrier signal having a second frequency, with a second interrogator using a second communication protocol;

wherein said first frequency is substantially identical to said, second frequency;

wherein said first operating mode is a default operating mode;

wherein said controller is configured to switch said passive RFID tag from said default operating mode to said second operating triode upon said detector detecting a trigger;

wherein said controller is further configured to maintain said, passive RFID tag in said, second operating mode for a predetermined period of time, wherein said predetermined period of time is selected from a group of time periods comprising a temporary duration and a permanent duration;

(b) transmitting an interrogation signal to said passive RFID tag;

(c) using said antenna to wirelessly inductively couple a magnetic field of said interrogation signal to power up said passive RFID tag;

(d) using said detector to determine a communication protocol of said interrogation signal, said determined communication protocol being one of said first communication protocol and said second communication protocol;

(e) using said controller to operate said passive RFID tag in an operating mode corresponding to said determined communication protocol, said operating mode being one of said first operating mode and said second operating mode; and (f) wirelessly communicating, via said antenna, said tag identifier using said detei mined communication protocol in response to said interrogation signal.

62. The method of claim 61, wherein said determined communication protocol is said first communication protocol with said first carrier frequency in an HF frequency range.

63. The method of claim 62, wherein said first carrier frequency is about 13.56 MHz.

64. The method of claim 63, wherein said first communication protocol is an NFC-type protocol.

65. The method claim 61, wherein said determined communication protocol is said second communication protocol, said second communication protocol being a commandless asynchronous protocol having a communication range that is greater than a communication range of said first communication protocol, and wherein said step of wirelessly communicating said tag identifier in response to said interrogation signal comprises transmitting said unique tag identifier via a random hold-off-and retransmit scheme.

66. The method of claim 65, wherein said random hold-off-and-retransmit scheme comprises repetitive transmissions of said, unique tag identifier in a pseudo-random manner at an average duty cycle between about 0.2 percent and about 4 percent.

67. The method of claim 65, wherein said random hold-off-and-retransmit scheme comprises repetitive transmissions of said unique tag identifier in a pseudo-random manner at a data rate between about 64 kbits/sec and 256 kbits/sec.

68. The method of claim 65, further comprising the step of encoding said unique tag identifier using a pulse position encoding technique.

69. The method of claim 61, wherein said second carrier signal is a continuous wave carrier signal, and wherein the step of said detector detecting a trigger comprises detecting a level of magnetic field of said interrogation signal that is greater than a predetermined threshold.

70. The method of claim 61, wherein said second carrier signal is a continuous wave carrier signal, and wherein said trigger is one of (a) a short interruption in said second continuous wave carrier signal and (b) a modulation dip in said second carrier signal.

71. The method of claim 61, wherein said unique tag identifier is hard coded into memory during manufacture of said passive RFID tag.

72. The method of claim 61, wherein said memory comprises at least one of a metal mask, a laser fuse, and a one-time-programmable antifuse read only memory.

73. An RFID system comprising:
(a) passive RFID tag comprising
(i) an antenna for enabling powering up of said passive RFID tag via wireless inductive coupling of a magnetic field; and
(ii) an integrated circuit comprising
a memory storing a unique tag identifier;
a modulator operatively coupled to said antenna:
a demodulator operatively coupled to said antenna;
a detector operatively coupled to said demodulator and configured to determine a communication protocol of an interrogation signal; and
a controller operatively coupled to said detector, said controller configured to operate said passive RFD tag in a first operating mode and in a second operating mode;

wherein said first operating mode enables said passive RFID tag to communicate, via said antenna, using a first communication protocol utilizing a first carrier signal having a first frequency;

wherein said second operating mode enables said passive RFID tag to communicate, via said antenna, using a second communication protocol utilizing a second carrier signal having a second frequency;

wherein said first frequency is substantially identical to said, second frequency;

wherein said first operating mode is a default operating mode;

wherein said controller is configured to switch said passive RFID tag from said default operating mode to said second operating mode upon said detector detecting a trigger; and wherein said controller is configured to enable said passive RFID tag to remain in said second operating mode for a predetermined period of time, wherein said predetermined period of time is selected from a group of time periods comprising a temporary duration and a permanent duration; and (b) a first interrogator for communicating with said passive RFID tag using a communication protocol that is one of said first communication protocol and said second communication protocol.

74. The RFID system of claim 73, wherein said communication protocol of said first interrogator enables communication in an HF frequency range.

75. The RFID system of claim 74, wherein, said communication protocol of said first interrogator enables communication at about 13.56 MHz.

76. The RFID system of claim 75, wherein said communication protocol of said first interrogator is said first communication protocol, said first communication protocol being an NFC-type protocol.

77. The RFID system of claim 73, wherein said communication protocol of said first interrogator is said first communication protocol, said first communication protocol being a short-communication-range command-and-control protocol.

78. The RFID system of claim 73, wherein said second communication protocol has a communication range that is greater than a communication range of said first communication protocol, and wherein said communication protocol of said first interrogator is said second communication protocol.

79. The RFD system of claim 78, wherein said communication protocol of said first interrogator is a commandless asynchronous protocol, and wherein said controller of said passive RFID tag enables transmissions of said unique tag identifier to said first interrogator via a random hold-off-and-retransmit scheme.

80. The RFID system of claim 79, wherein said random bold-off-and-retransmit scheme comprises repetitively transmitting said unique tag identifier in a pseudo-random manner at an average duty cycle between about 0.2 percent and about 4 percent.

81. The RFID system of claim 79, wherein said random hold-off-and-retransmit scheme comprises repetitively transmitting said unique tag identifier in a pseudo-random manner at a data rate between about 64 kbits/sec and 256 kbits/sec.

82. The RFID system of claim 79, wherein said transmissions of said unique tag identifier include data encoded using a pulse position, encoding technique.

83. The RFID system of claim 79, wherein said first interrogator is configured for use in a fully automated application.

84. The RFID system of claim 73, wherein said second carrier signal is a continuous wave carrier signal, and wherein said trigger is a level of said magnetic field excitation that is greater than a predetermined threshold.

85. The RFID system of claim 73, wherein said second carrier signal is a continuous wave carrier signal, and wherein said trigger is one of (a) a short interruption in said second continuous wave carrier signal and (b) a modulation dip in said second continuous wave carrier signal.

86. The RFID system of claim 73, wherein said unique tag identifier is hard coded into said memory during manufacture of said passive RFID tag.

87. The RED system of claim 73, wherein said memory comprises at least one of a metal mask, a laser fuse, and a one-time-programmable antifuse read only memory.

88. The RFID system of claim 73, wherein said first interrogator is a portable handheld interrogator comprising a directional antenna, said directional antenna comprising a solenoid coil wound around a ferrite rod core having magnetic permeability Mu in the range of about 40 to 250.

89. The RFD system of claim 88, wherein said ferrite rod is a cylinder of a diameter D and a length L, and wherein at least one of said diameter D and said length L is increased to allow said directional antenna to generate magnetic field of at least about 0.15 amperes/meter away from said ferrite rod.

90. The RFID system of claim 73, wherein said first interrogator comprises
(a) a magnetic core solenoid loop antenna having an inductance value L; and
(b) a matching network in series with said magnetic core solenoid loop antenna, said matching network having an effective capacitance value C, wherein said second carrier signal of said second communication protocol of said first interrogator is a continuous wave carrier signal in an HF frequency range, and wherein said matching network and said magnetic core solenoid loop antenna form a circuit having a resonant frequency that is substantially equal to said second frequency.

91. The RFID system of claim 73, further comprising a second interrogator for communicating with said passive RFID tag using said first communication protocol, said first communication protocol being a command-and-control protocol.

92. The RFID system of claim 91, wherein said first frequency of said first carrier signal of said first communication protocol is about 13.56 MHz, and wherein said first communication protocol is an NFC-type protocol.

93. An RFID system comprising:
(a) passive RFID tag comprising
(i) an antenna for enabling powering up of said passive RFID tag via wireless inductive coupling of a magnetic field; and
(ii) an integrated circuit comprising
a memory storing a unique tag identifier;
a modulator operatively coupled to said antenna;
a demodulator operatively coupled to said antenna;
a detector operatively coupled to said demodulator and configured to determine a communication protocol of an interrogation signal; and
a controller operatively coupled to said, detector, said controller configured to operate said passive RFID tag in a first operating mode and in a second operating mode;

wherein said first operating mode enables said passive RFID tag to communicate, via said antenna, using a first communication protocol utilizing a first carrier signal having a first frequency;

wherein said second operating mode enables said passive RFID tag to communicate, via said antenna, using a second communication protocol utilizing a second carrier signal having a second frequency;

wherein said first frequency is substantially identical to said second frequency; and wherein said second communication protocol has a communication range that is greater than a communication range of said first communication protocol; and
(b) a first interrogator for communicating with said passive RFID tag using said second communication protocol, wherein said first interrogator is a portable handheld interrogator comprising a directional antenna, said directional antenna comprising a solenoid coil wound around a ferrite rod core having magnetic permeability Mu in the range of about 40 to 250, wherein said ferrite rod is a cylinder of a diameter D and a length L, and wherein at least one of said diameter D and said length L is increased to allow said directional antenna to generate magnetic field of at least about 0.15 amperes/meter away from said ferrite rod.

94. An RFID system comprising:
(a) passive RFID tag comprising
(i) an antenna for enabling powering up of said passive RFID tag via wireless inductive coupling of a magnetic field; and (ii) an integrated circuit comprising
  a memory storing a unique tag identifier;
  a modulator operatively coupled to said antenna;
  a demodulator operatively coupled to said antenna;
  a detector operatively coupled to said demodulator and configured to determine a communication protocol of an interrogation signal; and
  a controller operatively coupled to said detector, said controller configured to operate said passive RFID tag in a first operating mode and in a second operating mode,
wherein said first operating mode enables said passive RFID tag to communicate, via said antenna, using a first communication protocol utilizing a first carrier signal having a first frequency,
wherein said second operating mode enables said passive RFID tag to communicate, via said antenna, using a second communication protocol utilizing a second carrier signal having a second frequency,
wherein said first frequency is substantially identical to said second frequency, and wherein said second communication protocol has a communication range that is greater than a communication range of said first communication protocol; and (b) a first interrogator for communicating with said passive RFID tag using said second communication protocol, wherein said first interrogator comprises
  i. a magnetic core solenoid loop antenna having an inductance value L; and
  ii. a matching network in series with said agnetic core solenoid loop antenna, said matching network having an effective capacitance value C,
wherein said second carrier signal of said second communication protocol of said first interrogator is a continuous wave carrier signal in an HF frequency range, and wherein said matching network and said magnetic core solenoid loop antenna form a circuit having a resonant frequency that is substantially equal to said second frequency.

* * * * *